(12) United States Patent
Toshiaki

(10) Patent No.: US 6,338,538 B1
(45) Date of Patent: *Jan. 15, 2002

(54) PRINTING SYSTEM AND METHOD OF RECORDING IMAGES

(75) Inventor: Kakutani Toshiaki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/562,669

(22) Filed: May 1, 2000

Related U.S. Application Data

(63) Continuation of application No. 09/029,865, filed on Mar. 17, 1998, now Pat. No. 6,099,105.

(30) Foreign Application Priority Data

| Jul. 18, 1996 | (JP) | ................................... 8-209232 |
| Nov. 22, 1996 | (JP) | ................................... 8-327845 |
| Jul. 17, 1997 | (WO) | ................................ PCT/JP97/02491 |

(51) Int. Cl.[7] .............................. B41J 2/205; B41J 2/21
(52) U.S. Cl. ............................................. 347/15; 347/43
(58) Field of Search ........................ 347/15, 43, 9, 347/12

(56) References Cited

U.S. PATENT DOCUMENTS

| 5,795,082 A | 8/1998 | Shimada et al. ............... 347/15 |
| 6,031,627 A | 2/2000 | Kakutani ..................... 347/15 |

*Primary Examiner*—John Barlow
*Assistant Examiner*—An H. Do
(74) *Attorney, Agent, or Firm*—Oblon, Spivak, McClelland, Maier & Neustadt, P.C.

(57) ABSTRACT

A system of the present invention first refers to a table of a recording ratio with respect to a higher-density ink and determines whether or not deep dots are to be formed, based on input tone data, according to a systematic dither method. When it is determined that deep dots are formed, the system drives a piezoelectric element PE of an ink head corresponding to the higher-density ink to form deep dots and computes a resulting value RV of the deep dots. When it is determined that deep dots are not formed, the system sets the resulting value RV of the deep dots equal to zero, determines whether or not light dots are to be formed by a lower-density ink, based on the input tone data, according to an error diffusion technique, and computes a resulting value RV of the light dots. The on/off control of the light dots minimizes a density error or a difference of a resulting image from an original image. This structure enables a printer for printing images with a plurality of dots having different densities per unit area to appropriately determine the on/off state of the plurality of dots and thereby improve the printing quality. Another applicable structure makes the existence or non-existence of dots by an achromatic color ink reflect upon formation of dots by cyan ink.

28 Claims, 30 Drawing Sheets

Fig. 9

INK COMPOSITIONS AND PROPERTIES

| | | C1 | C2 | M1 | M2 | Y | Bk |
|---|---|---|---|---|---|---|---|
| DYES | Directblue199 | 3.6 | 0.9 | | | | |
| | Acidred289 | | | 2.8 | 0.7 | | |
| | Directyellow86 | | | | | 1.8 | |
| | Foodblack2 | | | | | | 4.8 |
| DIETHYLENE GLYCOL | | 30 | 35 | 20 | 25 | 30 | 25 |
| SURFINOL 465 | | 1 | 1 | 1 | 1 | 1 | 1 |
| WATER | | 65.4 | 63.1 | 76.2 | 73.3 | 67.2 | 69.2 |
| VISCOSITY (mPa·s) | | 3.0 | 3.0 | 3.0 | 3.0 | 3.0 | 3.0 |

PRINTING SYSTEM AND METHOD OF RECORDING IMAGES

This is a continuation of Ser. No. 09/029,865 filed Mar. 17, 1998, now U.S. Pat. No. 6,099,105.

TECHNICAL FIELD

The present invention relates to a printing system with a head, which forms at least two different dots having different densities per unit area on an object, for recording multi-tone images by the dots formed by the head, as well as to a method of recording such images.

BACKGROUND ART

Color printers, in which a plurality of color inks are discharged from a head, are widely used as an output device of a computer that records a multi-color, multi-tone image processed by the computer. Several methods are applicable to print a multi-color, multi-tone image with three color inks, cyan, magenta, and yellow (CMY). One method is a technique adopted in the conventional printers. This technique expresses the tone of a printed image by the density of dots (frequency of appearance of dots per unit area) while fixing the size of dots formed on a sheet of paper by a spout of ink. Another method adjusts the diameter of dots formed on a sheet of paper, in order to vary the density of dots per unit area. Although the advanced processing of the head for forming ink particles has been improving the density of dots formable per predetermined length or the variable range of the dot diameter, the printers have only the limited printing density (resolution) to 300 through 720 dpi and the limited particle diameter to several ten microns. The resolution of printers is significantly lower than the resolution of silver photography, which has reached several thousand dpi on the film.

Dots are sparsely formed in an area of low image density, that is, in an area of low density of dots to be printed. This increases the degree of granularity and makes the dots conspicuous. A printing system and a method utilizing inks of different densities have been proposed to improve the printing quality. The proposed technique utilizes a high-density ink and a low-density ink for a certain color and regulates discharge of these inks, thereby realizing print with an excellent tone expression. By way of example, a method of and an apparatus for recording multi-tone images are disclosed in JAPANESE PATENT LAYING-OPEN GAZETTE No. 61-108254. The disclosed technique provides a head for forming deep dots and light dots for a specific color and regulates the number and overlap of deep dots and light dots formed in a predetermined dot matrix according to the density information of an input image, so as to record a multi-tone image.

The proposed printing system utilizing inks of different densities, however, does not give any specific idea on the allocation of high-density ink and low-density ink to the input tone signals of an original image. Inks of different densities are simply allocated in the order of densities to the input tone signals of the image (for example, FIG. 9 in JAPANESE PATENT LAYING-OPEN GAZETTE No. 2-215541).

In a printing system for forming at least two different dots having different densities per unit area (for example, dots by at least two inks of different densities), the object of the present invention is to enable the at least two different dots to be appropriately mapped to tone signals of an original image, thereby improving the quality of a resulting recorded image.

Disclosure of the Invention

The present invention applies the following structures, in order to realize at least part of the above and the other related objects. The present invention is directed to a first printing system with a head, which forms at least two different dots having different densities per unit area on an object, for recording a multi-tone image by a distribution of the dots, the first printing system including:

input means for successively receiving a tone signal of each target pixel included in an image to be printed;

recording density setting means for specifying a recording density to be realized by at least a selected one of a dot having a higher density per unit area, that is, a higher-density dot, and a dot having a lower density per unit area, that is, a lower-density dot, which are both included in the at least two different dots having different densities per unit area, based on the input tone signal;

first dot formation determination means for carrying out a multivaluing operation based on the specified recording density, and determining whether or not the selected one of the higher-density dot and the lower-density dot is to be formed;

second dot formation determination means for making a result of the multivaluing operation by the first dot formation determination means reflect upon a recording density to be realized by the other one of the higher-density dot and the lower-density dot, causing the other one of the higher-density dot and the lower-density dot to be subjected to a multivaluing operation according to the reflected recording density, and determining whether or not the other one of the higher-density dot and the lower-density dot is to be formed; and head driving means for driving the head based on results of the determination by the first dot formation determination means and the second dot formation determination means, in order to form the at least two different dots having different densities per unit area.

In the first printing system of the present invention, the recording density setting means specifies a recording density to be realized by at least a selected one of a higher-density dot and a lower-density dot, which are both included in the at least two different dots having different densities per unit area. The first dot formation determination means carries out a multivaluing operation based on the specified recording density, and determines whether or not the selected one of the higher-density dot and the lower-density dot is to be formed. The multivaluing operation may be binary coding, ternary coding, or higher-value coding. In case that the at least two different dots having different densities per unit area consist of only two different dots, the first dot formation determination means carries out the determination for either one of the two different dots. In case that the head can form four different dots, however, the first dot formation determination means may carry out the multivaluing operation simultaneously for two or more different dots. The second dot formation determination means makes the result of the multivaluing operation by the first dot formation determination means reflect upon a recording density to be realized by the other one of the higher-density dot and the lower-density dot. The second dot formation determination means then causes the other one of the higher-density dot and the. lower-density dot to be subjected to a multivaluing operation according to the reflected recording density, and determines whether or not the other one of the higher-density dot and the lower-density dot is to be formed. The head driving means drives the head based on the results of the determination by the first dot formation determination means and the second dot formation determination means, in order to form the at least two different dots having different densities per unit area.

This structure enables a density error due to formation of the selected one of the higher-density dot and the lower-density dot to be reduced by formation of the other one of the higher-density dot and the lower-density dot, so that the tone of an original image is reproduced by a combination of the at least two different dots.

This printing system may be carried out by a variety of embodiments. By way of example, the recording density setting means may specify only a recording density to be realized by the selected one of the higher-density dot and the lower-density dot, or alternatively may specify a recording density to be realized by the selected one of the higher-density dot and the lower-density dot as well as a recording density to be realized by the other one of the higher-density dot and the lower density dot, based on the input tone signal. In the latter case, the first printing system further includes recording density correcting means for computing correction data, which is to reflect upon the recording density to be realized by the other one of the higher-density dot and the lower-density dot, based on the result of the multivaluing operation with respect to the selected one of the higher-density dot and the lower-density dot, in order to correct the recording density to be realized by the other one of the higher-density dot and the lower-density dot. The second dot formation determination means determines whether or not the other one of the higher-density dot and the lower-density dot is to be formed, based on the corrected recording density.

In accordance with one preferable application of the first printing system of the present invention, the first dot formation determination means determines whether or not a first dot selected among the at least two different dots having different densities per unit area is to be formed, based on the input tone signal, prior to determination for formation of the other dots. When no formation of the first dot is determined, the second dot formation determination means determines whether or not a second dot having a different density per unit area from that of the first dot is to be formed. In this application, the first printing system further includes error diffusion means, which computes a difference between a printing density corresponding to the input tone signal and a printing density realized by the formed dots as a density error, based on the determination of dot formation by the first dot formation determination means and the second dot formation determination means. The error diffusion means then distributes the density error to peripheral pixels in the vicinity of a current target pixel of dot formation, in order to reflect upon the determination of dot formation with respect to the peripheral pixels by the first dot formation determination means and the second dot formation determination means.

The present invention is also directed to a second printing system with a head, which forms at least two different dots having different densities per unit area on an object, for recording a multi-tone image by a distribution of the dots, the second printing system including:

input means for successively receiving a tone signal of each target pixel included in an image to be printed;

tone value setting means for specifying a first dot tone value, that is, a tone value to be realized by a first dot selected among the at least two different dots having different densities per unit area, based on the input tone signal;

first dot formation determination means for determining whether or not the first dot is to be formed, based on the first dot tone value;

correction signal computing means for computing a correction signal by adding quantization errors distributed from peripheral processed pixels in the vicinity of the target pixel to the input tone signal;

second dot formation determination means for, when the first dot formation determination means determines no formation of the first dot, determining whether or not a second dot having a different density per unit area from that of the first dot is to be formed, based on the correction signal;

head driving means for driving the head based on results of the determination by the first dot formation determination means and the second dot formation determination means, in order to form the at least two different dots having different densities per unit area; and error diffusion means for computing a quantization error, which is a difference between the correction signal and a tone value realized by the formed dots, as a density error, based on the results of the determination by the first dot formation determination means and the second dot formation determination means, and distributing and diffusing the computed density error to peripheral pixels in the vicinity of the target pixel.

In the second printing system of the present invention, the input means successively receives a tone signal of each target pixel included in an image to be printed. The tone value setting means specifies a first dot tone value, that is, a tone value to be realized by a first dot selected among the at least two different dots having different densities per unit area, based on the input tone signal. The first dot formation determination means determines whether or not the first dot is to be formed, based on the first dot tone value. The correction signal computing means computes a correction signal by adding quantization errors distributed from peripheral processed pixels in the vicinity of the target pixel to the input tone signal. The second dot formation determination means carries out the processing, based on the correction signal. When the first dot formation determination means determines no formation of the first dot, the second dot formation determination means determines whether or not a second dot having a different density per unit area from that of the first dot is to be formed. The head driving means drives the head based on results of the determination by the first dot formation determination means and the second dot formation determination means, in order to form the at least two different dots having different densities per unit area. The error diffusion means computes a quantization error, which is a difference between the correction signal and a tone value realized by the formed dots, as a density error, based on the results of the determination by the first dot formation determination means and the second dot formation determination means, and distributes and diffuses the computed density error to peripheral pixels in the vicinity of the target pixel.

This structure enables a density error due to formation of the first dot to be reduced by formation of the second dot having a different density per unit area from that of the first dot, so that the tone of an original image is reproduced by a combination of the at least two different dots.

In accordance with one preferable application of either one of the first and the second printing systems, the second dot formation determination means includes: local effect computing means for calculating a local effect from the recording density of the selected dot, which is subjected to determination of dot formation by the first dot formation determination means, and a printing density realized by the selected dot; and recording density correcting means for correcting the recording density to be realized by the other dot by taking into account the local effect, so as to affect the determination of dot formation with respect to the other dot. In this structure, the local effect with respect to the selected dot affects the determination of dot formation with respect to the other dot. This structure makes it difficult to form the lower-density dot in a pixel where the higher-density dot has already been formed, thereby reducing the possibility of polarized formation of the at least two different dots having different densities per unit area. This improves the printing quality.

In accordance with one preferable embodiment, the local effect computing means calculates a difference between the recording density of the selected dot and the printing density realized by the selected dot as a local error, and the recording density correcting means adds a product of the local error and a predetermined weight to the recording density to be realized by the other dot, so as to affect the determination of dot formation with respect to the other dot.

The first dot formation determination means may carry out the determination for the dot having a higher density per unit area or alternatively for the dot having a lower density per unit area. The first dot subjected to the determination by the first dot formation determination means may depend upon the dot formation technique (for example, the error diffusion method or the systematic dither method) as well as the properties of an image to be printed. When the first dot formation determination means adopts a dither method, a systematic dither method is preferably carried out with a threshold matrix of discrete dither.

The head may discharge at least two inks of different densities to form the at least two different dots having different densities per unit area. It is preferable that the at least two inks of different densities include a higher-density ink and a lower-density ink and that a dye density of the lower-density ink is approximately one quarter a dye density of the higher-density ink.

When the head discharges a plurality of chromatic color inks to form chromatic dots as well as an achromatic color ink, such as black ink, to form an achromatic dot, one preferable structure of the printing system includes third dot formation determination means for determining whether or not the achromatic dot is to be formed by the achromatic color ink. When the third dot formation determination means determines formation of the achromatic dot by the achromatic color ink, the preferable structure assumes that the first dot formation determination means determines formation of the selected dot and activates the second dot formation determination means and the error diffusion means. This is because the achromatic color is considered to include the components of the chromatic colors in multi-color printing.

In case that the achromatic dot is formed by the achromatic color ink, the degree of effect of the achromatic dot on a density error with respect to the chromatic color inks may be specified for each chromatic color. The density error may be distributed to density errors with respect to the respective chromatic color inks.

The head of such a printing system discharges two inks of different densities for at least either of cyan and magenta, in order to enable color printing.

The present invention is further directed to a third printing system with a head, which forms at least two different dots having different densities per unit area by a chromatic color ink as well as an achromatic dot by an achromatic color ink on an object, for recording a multi-tone image by a distribution of the dots, the third printing system including:

input means for successively receiving a tone signal of each target pixel included in an image to be printed:

density specifying means for specifying a density to be realized by the chromatic color ink and a density to be realized by the achromatic color ink, based on the input tone signal;

achromatic dot formation determination means for carrying out a multivaluing operation for the achromatic color ink, based on the density to be realized by the achromatic color ink, and determining whether or not the achromatic dot is to be formed by the achromatic color ink;

density correcting means for obtaining correction data, which reflects upon the density to be realized by the chromatic color ink, based on the result of the multivaluing operation with respect to the achromatic color ink, in order to correct the density to be realized by the chromatic color ink;

chromatic dot formation determination means for carrying out a multivaluing operation with respect to the at least two different dots having different densities per unit area, based on the corrected density to be realized by the chromatic color ink, and determining whether or not the at least two different dots are to be formed; and head driving means for driving the head based on results of the determination by the achromatic dot formation determination means and the chromatic dot formation determination means, in order to form the at least two different dots having different densities per unit area by the chromatic color ink and the achromatic dot by the achromatic color ink.

In the third printing system according to the present invention, formation of the achromatic dot by the achromatic color affects the formation of the at least two different dots having different densities per unit area by the chromatic color. The achromatic dot is considered to include the component of the chromatic color. This structure thus appropriately controls the on/off state of the chromatic dot, based on the on/off state of the achromatic dot (for example, black dot).

The present invention is also directed to a fourth printing system with a head, which forms at least two different dots having different densities per unit area on an object, for recording a multi-tone image by a distribution of the dots, the fourth printing system including:

input means for successively receiving a tone signal of each target pixel included in an image to be printed;

first dot formation determination means for carrying out a multivaluing operation with respect to a selected dot among the at least two different dots having different densities per unit area, based on the input tone signal, and determining whether or not the selected dot is to be formed;

difference computing means for computing a difference between the input tone signal and a printing density realized by the selected dot;

second dot formation determination means for carrying out a multivaluing operation with respect to another dot among the at least two different dots having different densities, based on the difference, and determining whether or not the another dot is to be formed; and head driving means for driving the head based on results of the determination by the first dot formation determination means and the second dot formation determination means, in order to form the at least two different dots having different densities per unit area.

The fourth printing system of the present invention first carries out a multivaluing operation with respect to a selected dot among the at least two different dots having different densities per unit area. The system then carries out a multivaluing operation with respect to another dot among the at least two different dots having different densities, based on a difference between the input tone signal and a printing density realized by the selected dot. The head is subsequently driven to form the at least two different dots having different densities per unit area.

In accordance with one preferable application of the fourth printing system, the difference computing means includes:

first effect computing means for calculating a first effect on the multivaluing operation with respect to the another dot, based on the tone signal and a recording density realized by the selected dot; and second effect computing means for calculating a second effect on the multivaluing operation with respect to the another dot, based on the printing density realized by the selected dot, the difference computing means computing the difference by taking into account the first effect and the second effect.

In this structure, the difference is computed by taking into account the degree of these first effect and the second effect. Varying the degree of these effects reflects upon the determination of formation or non-formation of the another dot based on the difference by the second dot formation determination means.

In accordance with another preferable application, the fourth printing system further includes error diffusion means for computing a difference between a printing density realized by the another dot based on the input tone signal and a printing density realized by the another dot as a density error, based on the determination of dot formation by the second dot formation determination means, and distributing the density error to peripheral pixels in the vicinity of a current target pixel of dot formation, in order to reflect upon the determination of dot formation with respect to the peripheral pixels by the second dot formation determination means. This structure ensures the advantages of the error diffusion technique (reduction of the mean density error and improvement in printing quality).

In the fourth printing system of the present invention, the first dot formation determination means or the second dot formation determination means may determine formation or non-formation of the dot by a dither method. When the dither method is adopted, a threshold matrix of discrete dither is preferably used.

In accordance with one preferable application, the head forms at least two different dots of different diameters as the at least two different dots having different densities per unit area. This application corresponds to a printing system with a mechanism of varying the dot diameter. Other possible structures to form the at least two different dots having different densities per unit area include a structure using at least two inks of different dye densities and a structure for changing the number of times of discharging ink of a fixed density at substantially the same place.

The head for forming the at least two different dots having different densities or different diameters may have a mechanism for discharging ink particles under a pressure applied to each ink running through an ink conduit by application of a voltage to a piezoelectric element arranged in the ink conduit. Alternatively the head may have a mechanism for discharging ink particles under a pressure applied to each ink running through an ink conduit by air bubbles that are produced by a supply of electricity to a heating body arranged in the ink conduit. These mechanisms give very fine ink particles and enable adequate regulation of the amount of each ink. A number of nozzles for spraying the ink particles may be formed on the head. In this case, a plurality of nozzles are arranged in a feeding direction of a sheet of paper, on which the multi-tone image is printed, for each color ink of each density. This structure enhances the printing rate.

The present invention is also directed to a first method of recording a multi-tone image by a distribution of at least two different dots having different densities per unit area, which are formed on an object by a head, the first method including the steps of:

successively receiving a tone signal of each target pixel included in an image to be printed;

specifying a recording density to be realized by at least a selected one of a dot having a higher density per unit area, that is, a higher-density dot, and a dot having a lower density per unit area, that is, a lower-density dot, which are both included in the at least two different dots having different densities, based on the input tone signal;

carrying out a multivaluing operation based on the specified recording density, and determining whether or not the selected one of the higher-density dot and the lower-density dot is to be formed;

making a result of the multivaluing operation with respect to the selected dot reflect upon a recording density to be realized by the other one of the higher-density dot and the lower-density dot, causing the other one of the higher-density dot and the lower-density dot to be subjected to a multivaluing operation according to the reflected recording density, and determining whether or not the other one of the higher-density dot and the lower-density dot is to be formed; and driving the head based on results of the determination with respect to the selected dot and the other dot, in order to form the at least two different dots having different densities per unit area.

This structure enables a density error due to formation of the selected one of the higher-density dot and the lower-density dot to be reduced by formation of the other one of the higher-density dot and the lower-density dot, so that the tone of an original image is reproduced by a combination of the at least two different dots.

In accordance with one preferable application, the first method determines whether or not a first dot selected among the at least two different dots having different densities per unit area is to be formed, based on the input tone signal, prior to determination for formation of the other dots. When no formation of the first dot is determined, the first method determines whether or not a second dot having a different density per unit area from that of the first dot is to be formed. In this application, the first method then computes a difference between a printing density corresponding to the input tone signal and a printing density realized by the formed dots as a density error, based on the determination of dot formation. The density error is distributed to peripheral pixels in the vicinity of a current target pixel of dot formation, in order to reflect upon the determination of dot formation with respect to the peripheral pixels.

This structure enables a density error due to formation of the selected one of the higher-density dot and the lower-density dot to be reduced by formation of the other one of the higher-density dot and the lower-density dot, so that the tone of an original image is reproduced by a combination of the at least two different dots.

The present invention is further directed to a second method of recording a multi-tone image by a distribution of at least two different dots having different densities per unit area, which are formed on an object by a head, the second method including the steps of:

successively receiving a tone signal of each target pixel included in an image to be printed;

specifying a first dot tone value, that is, a tone value to be realized by a first dot selected among the at least two different dots having different densities per unit area, based on the input tone signal;

determining whether or not the first dot is to be formed, based on the first dot tone value;

computing a correction signal by adding quantization errors distributed from peripheral processed pixels in the vicinity of the target pixel to the input tone signal;

when no formation of the first dot is determined according to the first dot tone value, determining whether or not a second dot having a different density per unit area from that of the first dot is to be formed, based on the correction signal;

driving the head based on results of the determination with respect to the first dot and the second dot, in order to form the at least two different dots having different densities per unit area; and computing a quantization error, which is a difference between the correction signal and a tone value realized by the formed dots, as a density error, based on the results of the determination with respect to the first dot and the second dot, and distributing and diffusing the computed density error to peripheral pixels in the vicinity of the target pixel.

The second method of the present invention successively receives a tone signal of each target pixel included in an image to be printed, and specifies a first dot tone value, that is, a tone value to be realized by a first dot selected among the at least two different dots having different densities per unit area, based on the input tone signal. It is then determined whether or not the first dot is to be formed, based on the first dot tone value. The second method then computes a correction signal by adding quantization errors distributed from peripheral processed pixels in the vicinity of the target pixel to the input tone signal, and carries out the processing, based on the correction signal. When no formation of the first dot is determined, it is then determined whether or not a second dot having a different density per unit area from that of the first dot is to be formed. The head is driven, based on results of the determination of dot formation, so as to form the at least two different dots having different densities per unit area. The second method computes a quantization error, which is a difference between the correction signal and a tone value realized by the formed dots, as a density error, based on the results of the determination of dot formation, and distributes and diffuses the computed density error to peripheral pixels in the vicinity of the target pixel.

This structure enables a density error due to formation of the first dot to be reduced by formation of the second dot having a different density per unit area from that of the first dot, so that the tone of an original image is reproduced by a combination of the at least two different dots.

The present invention also includes some other applications. The first application is a structure, in which one or related ones of the input means, the error diffusion means, the first dot formation determination means, the correction signal computing means, and the second dot formation determination means are not included in the casing of the printing system but in an apparatus for outputting images to be printed. The error diffusion method as well as the first dot formation determination means and the second dot formation determination means may be realized by discrete circuits or alternatively by the software in an arithmetic and logic circuit including a CPU. In the latter case, the apparatus for outputting images to be printed, such as a computer, carries out the processing related to generation of dots. Only a mechanism for regulating discharge of inks from the head to actually form the generated dots, for example, on a sheet of paper, is disposed in the casing of the printing system. Another possible structure divides these required means into two groups, and enables one group to be realized in the casing of the printing system and the other group to be realized in the apparatus for outputting images.

The second application is a portable recording medium, on which the software loaded to the computer system for execution is recorded. At least part of the input means and the dot formation determination means may be realized by an arithmetic and logic circuit including a CPU (hardware) and a software program executed thereon. At least part of the software program is stored on the portable recording medium.

The third application is a program supply apparatus for supplying the software program via a communications line.

The fourth application is an ink cartridge used in any one of the printing systems of the present invention. In color printing with at least two inks of different dye densities to form at least two different dots having different densities per unit area, in accordance with one preferable structure, the ink cartridge includes a black ink cartridge and a color ink cartridge that is separate from the black ink cartridge and reserves a plurality of color inks including at least two inks of different densities. This structure allows the black ink cartridge that is more frequently used for printing characters and the color ink cartridge to be replaced at arbitrary timings.

In the ink cartridge used for the printing system with the inks of different densities, at least two inks having an identical hue but different densities are arranged adjacent to each other. In accordance with a concrete structure, cyan ink, ink having a lower dye density than the cyan ink, magenta ink, ink having a lower dye density than the magenta ink, and yellow ink are arranged in this sequence in the ink cartridge.

BRIEF DESCRIPTION OF THE DRAWINGS

FIG. 9 shows compositions of color inks used in the embodiment;

BEST MODES FOR CARRYING OUT THE INVENTION

Figure 1:
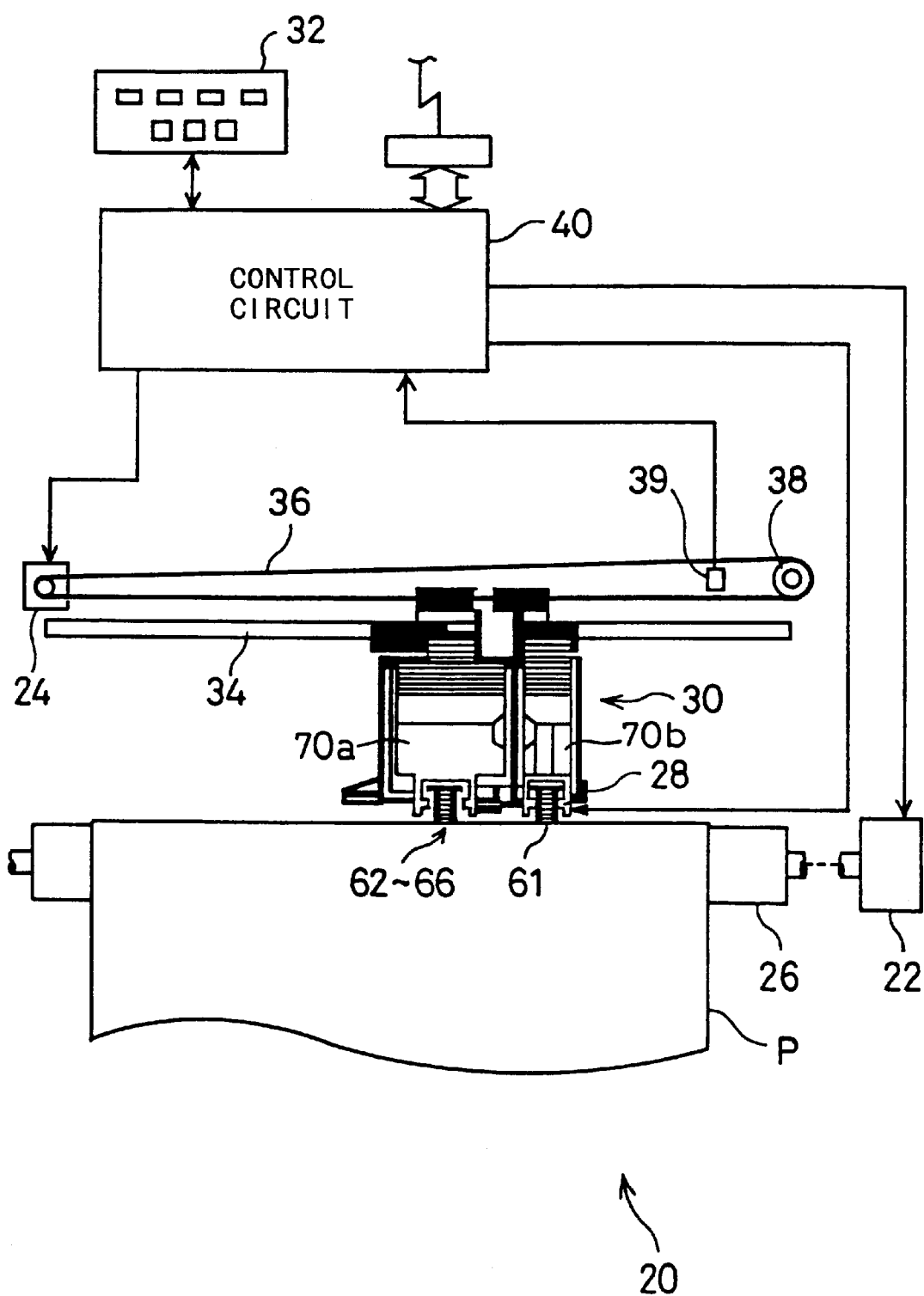
FIG. 1 schematically illustrates structure of a printer 20 embodying the present invention.

Some modes of carrying out the present invention are discussed below as preferred embodiments. FIG. 1 schematically illustrates structure of a printer 20 as an embodiment according to the present invention. The printer 20 has a mechanism for feeding a sheet of paper P by means of a sheet feed motor 22, a mechanism for reciprocating a carriage 30 along the axis of a platen 26 by means of a carriage motor 24, a mechanism for driving a print head 28 mounted on the carriage 30 to control discharge of ink and production of dot patterns, and a control circuit 40 for transmitting signals to and from the sheet feed motor 22, the carriage motor 24, the print head 28, and a control panel 32.

The mechanism for feeding the sheet of paper P has a gear train (not shown) for transmitting rotations of the sheet feed motor 22 to the platen 26 as well as a sheet feed roller (not shown). The mechanism for reciprocating the carriage 30 includes a sliding shaft 34 arranged in parallel with the axis of the platen 26 for slidably supporting the carriage 30, a pulley 38, an endless drive belt 36 spanned between the carriage motor 24 and the pulley 38, and a position sensor 39 for detecting the position of the origin of the carriage 30.

Figure 2:
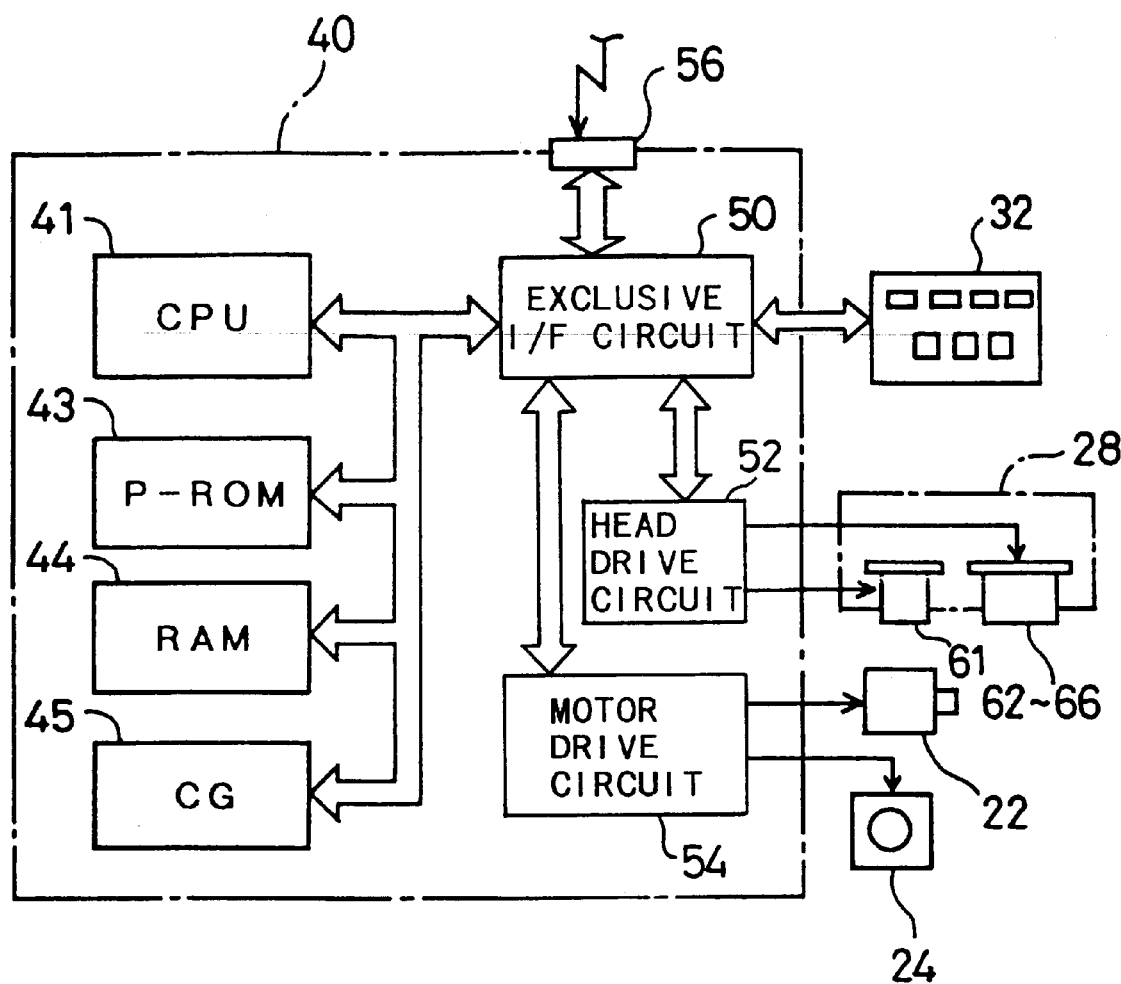
FIG. 2 is a block diagram showing structure of a control circuit 40 included in the printer 20.

The following describes the structure of the control circuit 40 and the peripheral units included in the printer 20. Referring to the block diagram of FIG. 2, the control circuit 40 is constructed as a known arithmetic and logic operation circuit including a CPU 41, a P-ROM 43 for storing programs, a RAM 44, and a character generator (CG) 45 for storing dot matrices of characters. The control circuit 40 further includes an exclusive I/F circuit 50 exclusively working as an interface to an external motor and the like, a head drive circuit 52 connected with the exclusive I/F circuit 50 for driving the print head 28, and a motor drive circuit 54 connected with the exclusive I/F circuit 30 for driving the sheet feed motor 22 and the carriage motor 24. The exclusive I/F circuit 50 includes a parallel interface circuit and is connected to a computer via a connector 56 to receive printing signals output from the computer. Output of image signals from the computer will be discussed later.

Figure 3:
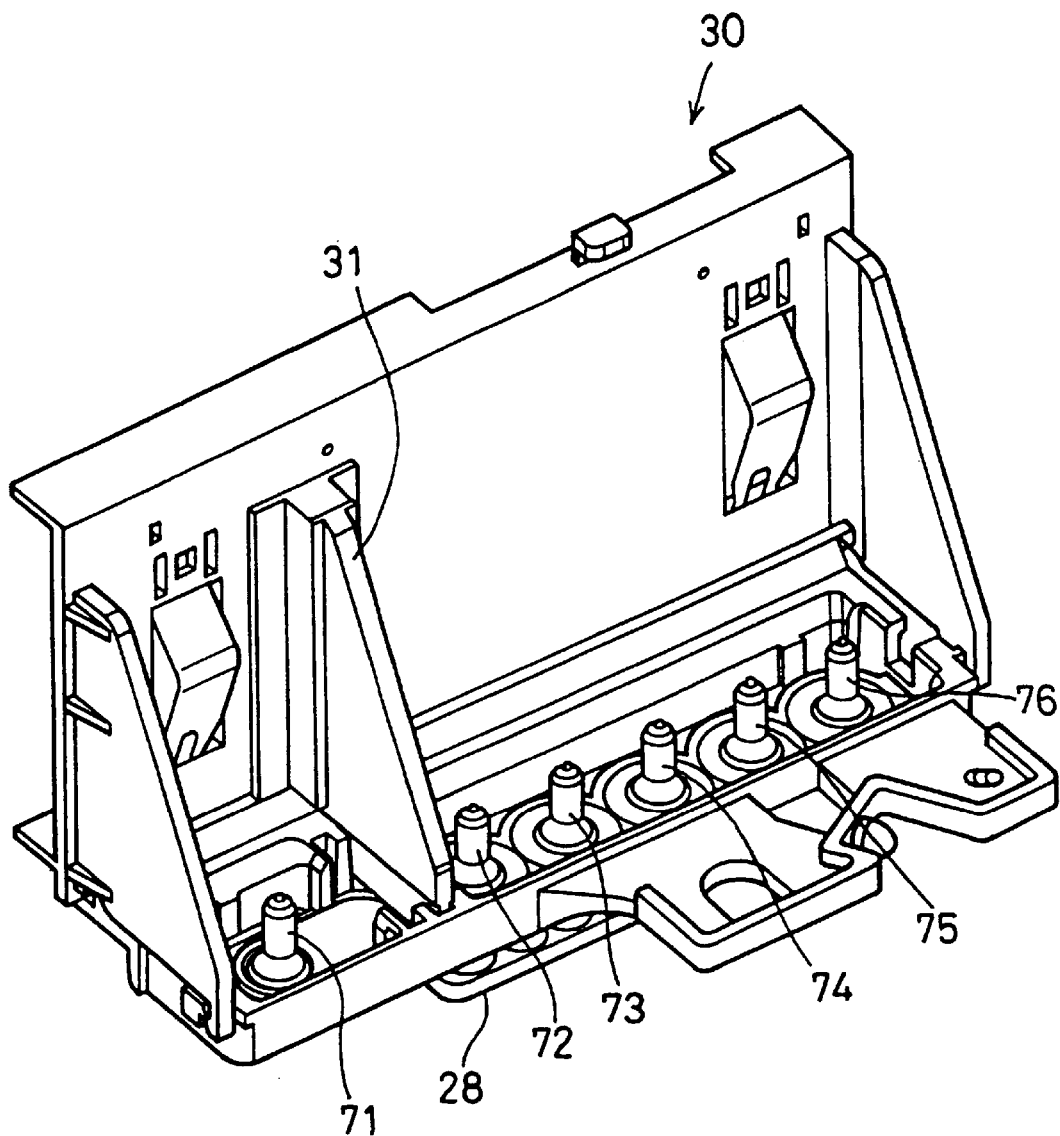
FIG. 3 is a perspective view illustrating structure of a carriage 30.
Figure 4:
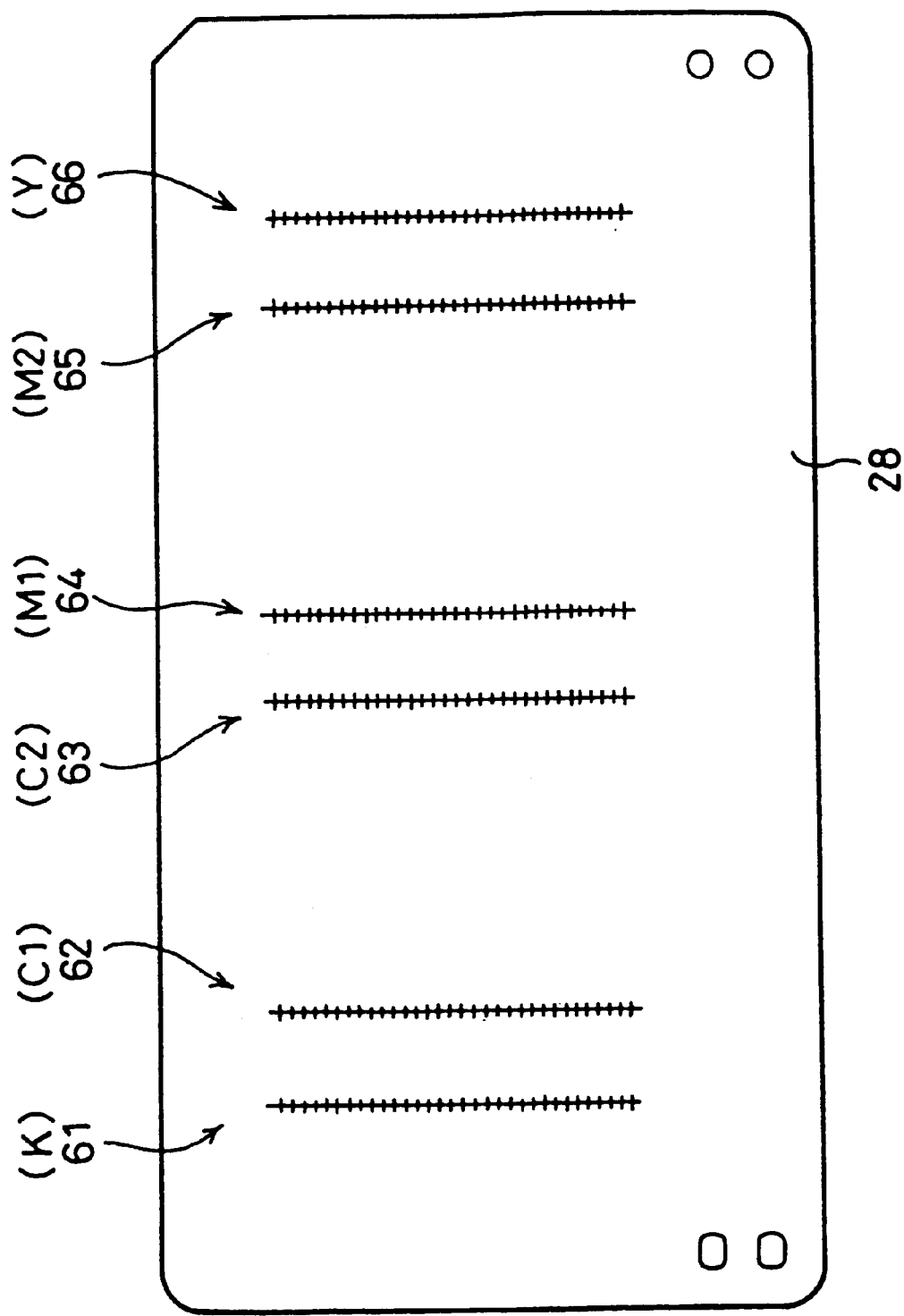
FIG. 4 shows an arrangement of color ink heads 61 through 66 in a print head 28.
Figure 5:
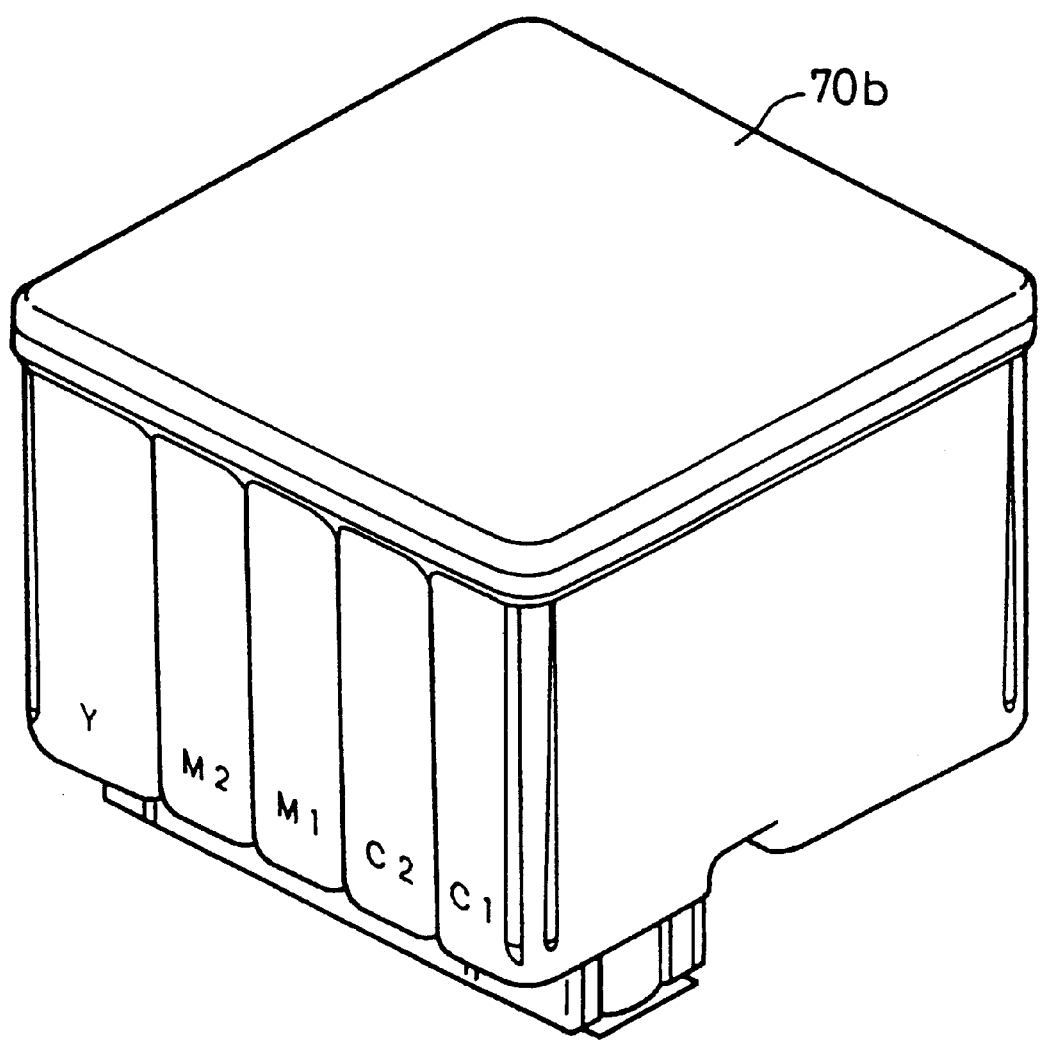
FIG. 5 is a perspective view showing a color ink cartridge 70.

The following describes a concrete structure of the carriage 30 and the principle of discharging ink by the print head 28 mounted on the carriage 30. FIG. 3 is a perspective view showing structure of the carriage 30. FIG. 4 is a plan view illustrating nozzles arranged in the print head 28 set on the lower portion of the carriage 30 for spraying the respective color inks. A black ink cartridge and a color ink cartridge 70 (see FIG. 5) are attachable to the substantially L-shaped carriage 30 shown in FIG. 3. A partition wall 31 separates the black ink cartridge from the color ink cartridge. Six color ink heads 61 through 66 for respectively discharging color inks are formed in the print head 28 that is disposed on the lower portion of the carriage 30. Ink supply pipes 71 through 76 for leading inks from ink tanks to the respective color ink heads 61 through 66 are formed upright on the bottom of the carriage 30 as shown in FIG. 3. When the black ink cartridge and the color ink cartridge 70 are attached downward to the carriage 30, the ink supply pipes 71 through 76 are inserted into connection apertures (not shown) formed in the respective cartridges.

Figure 6:
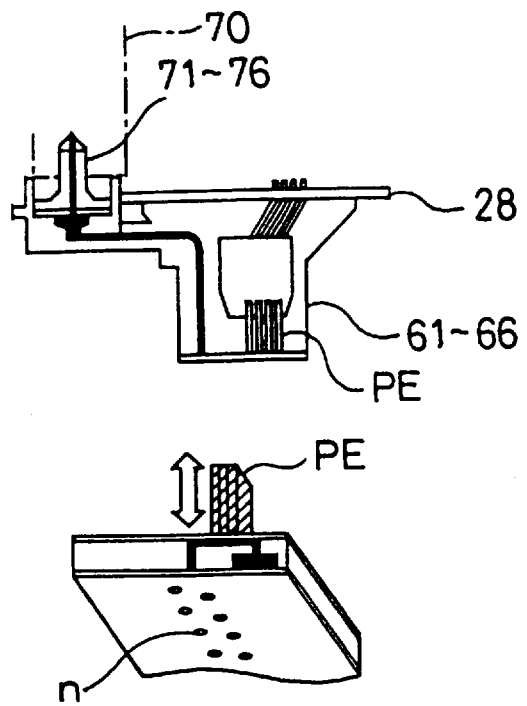
FIG. 6 shows a mechanism of ink discharge in each of the color ink heads 61 through 66.

When the ink cartridge 70 is attached to the carriage 30, inks in the ink cartridge 70 are sucked out by capillarity through the ink supply pipes 71 through 76 and are led to the color ink heads 61 through 66 formed in the print head 28 arranged on the lower portion of the carriage 30 as shown in FIG. 6. In case that the ink cartridge 70 is attached to the carriage 3 0 f or the first time, a pump works to suck inks into the respective color ink heads 61 through 66. In this embodiment, structures of the pump for suction and a cap for covering the print head 28 during the suction are not illustrated nor described specifically.

Figure 7:
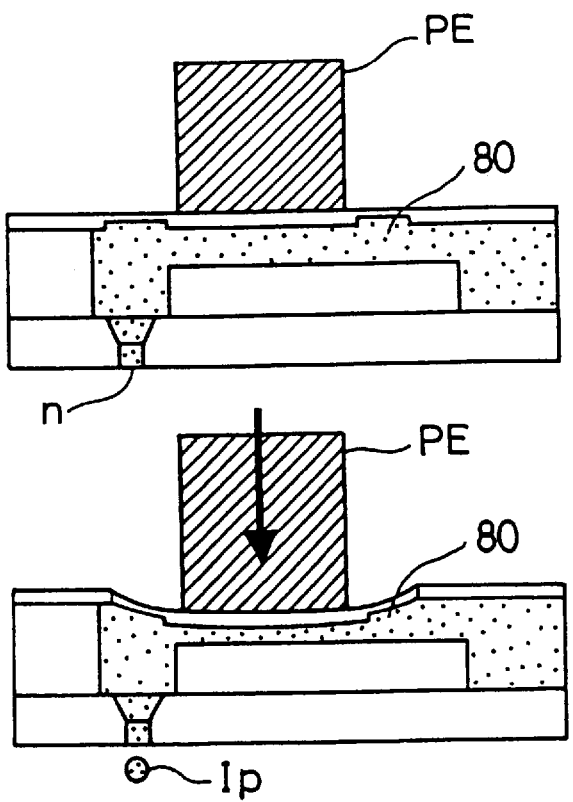
FIG. 7 shows a process of discharging ink particles Ip by extension of a piezoelectric element PE.

A row of thirty-two nozzles 'n' are formed in each of the color ink heads 61 through 66 as shown in FIGS. 4 and 6. A piezoelectric element PE having excellent response, which is one of electrically distorting elements, is arranged for each row of nozzles 'n'. FIG. 7 illustrates a configuration of the piezoelectric element PE and the nozzles 'n'. The piezoelectric element PE is disposed at a position that comes into contact with an ink conduit 80 for leading ink to the nozzles 'n'. As is known, the piezoelectric element PE has a crystal structure that is subjected to a mechanical stress due to application of a voltage and thereby carries out extremely high-speed conversion of electrical energy to mechanical energy. In this embodiment, application of a voltage between electrodes on either ends of the piezoelectric element PE for a predetermined time period causes the piezoelectric element PE to abruptly extend and deform one side wall of the ink conduit 80 as shown in the lower drawing of FIG. 7. The volume of the ink conduit 80 is reduced with an extension of the piezoelectric element PE, and a certain amount of ink corresponding to the volume reduction is sprayed as ink particles Ip from the ends of the nozzles 'n' at a high speed. The ink particles Ip soak into the sheet of paper P set on the platen 26, so as to print images.

In order to ensure spaces for the piezoelectric elements PE, the six color ink heads 61 through 66 are divided into three pairs on the print head 28 as shown in FIG. 4. The first pair includes the black ink head 61 that is arranged at one end close to the black ink cartridge and the cyan ink head 62 that is disposed next to the black ink head 61. The second pair includes the light cyan ink head 63 for cyan ink having the lower density than that of the standard cyan ink supplied to the cyan ink head 62 (hereinafter referred to as light cyan ink.) and the magenta ink head 64. The third pair includes the light magenta ink head 65 for magenta ink having the lower density than that of the standard magenta ink supplied to the magenta ink head 64 (hereinafter referred to as light magenta ink) and the yellow ink head 66. The compositions and densities of the respective inks will be discussed later.

Figure 8:
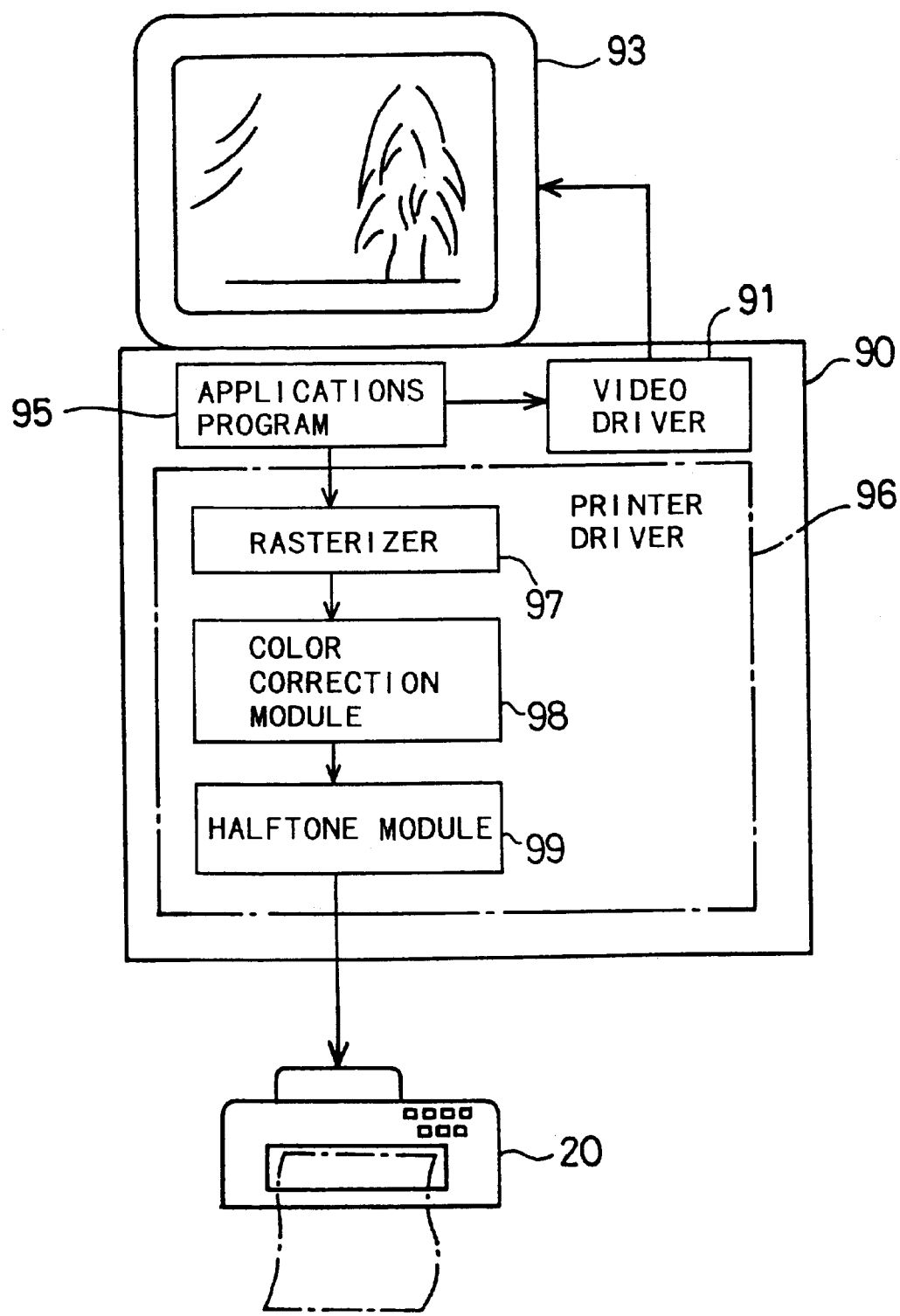
FIG. 8 is a block diagram showing a series of processes that enable the computer 90 to print images based on image information.

In the printer 20 of the embodiment having the hardware structure discussed above, while the sheet feed motor 22 rotates the platen 26 and the other related rollers to feed the sheet of paper P, the carriage motor 24 drives and reciprocates the carriage 30, simultaneously with actuation of the piezoelectric elements PE on the respective color ink heads 61 through 6.6 of the print head 28. The printer 20 accordingly sprays the respective color inks and transfers multi-color images onto the sheet of paper P. Referring to FIG. 8, the printer 20 prints multi-color images based on signals output from an image production apparatus, such as a computer 90, via the connector 56. In this embodiment, an applications program 95 working in the computer 90 processes images and displays the processed images on a CRT display 93 via a video driver 91. When the applications program 95 outputs a printing instruction, a printer driver 96 in the computer 90 receives image information from the applications program 95 and the printer 20 converts the image information to printable signals. In the example of FIG. 8, the printer driver 96 includes a rasterizer 97 for converting the image information processed by the applications program 95 to dot-based color information, a color correction module 98 for causing the image information that has been converted to the dot-based color information (tone data) to be subjected to color correction according to the colorimetric characteristics of an image output apparatus (the printer 20 in this embodiment) and a halftone module 99 for generating halftone image information, which expresses density of a specified area by the existence or non-existence of ink in each dot unit, from the color-corrected image information. Operations of these modules are known to the skilled in the art and are thus not specifically described here in principle, though the contents of the halftone module 99 will be discussed later.

As discussed above, the printer 20 of the embodiment has the additional heads 63 and 65 for light cyan ink and light magenta ink other than the four heads 61, 62, 64, and 66 for the standard four color inks K, C, M, and Y in the print head 28. As shown in FIG. 9, light cyan ink and light magenta ink have lower dye densities than those of standard cyan ink and magenta ink. Cyan ink of standard density (defined as C1 in FIG. 9) includes 3.6% by weight of Direct blue 99 as a dye, 30% by weight of diethylene glycol, 1% by weight of Surfinol 465, and 65.4% by weight of water. Light cyan ink (defined as C2 in FIG. 9), on the other hand, includes only 0.9% by weight of Direct blue 99, that is, one quarter the dye density of the cyan ink C1, and 35% by weight of diethylene glycol and 63.1% by weight of water for adjustment of the viscosity. Magenta ink of standard density (defined as M1 in FIG. 9) includes 2.8% by weight of Acid red 289 as a dye, 20% by weight of diethylene glycol, 1% by weight of Surfinol 465, and 79% by weight of water. Light magenta ink (defined as M2 in FIG. 9), on the other hand, includes only 0.7% by weight of Acid red 289, that is, one quarter the dye density of the magenta ink M1, and 25% by weight of diethylene glycol and 74% by weight of water for adjustment of the viscosity.

As shown in FIG. 9, yellow ink Y includes 1.8% by weight of Direct Yellow 86 as a dye, whereas black ink K includes 4.8% by weight of Food black 2 as a dye. All these inks are adjusted to have the viscosity of approximately 3 [mPa·s]. Adjustment of the viscosity to the substantially identical level enables identical control of the piezoelectric elements PE for the respective color heads 61 through 66.

Figure 10:
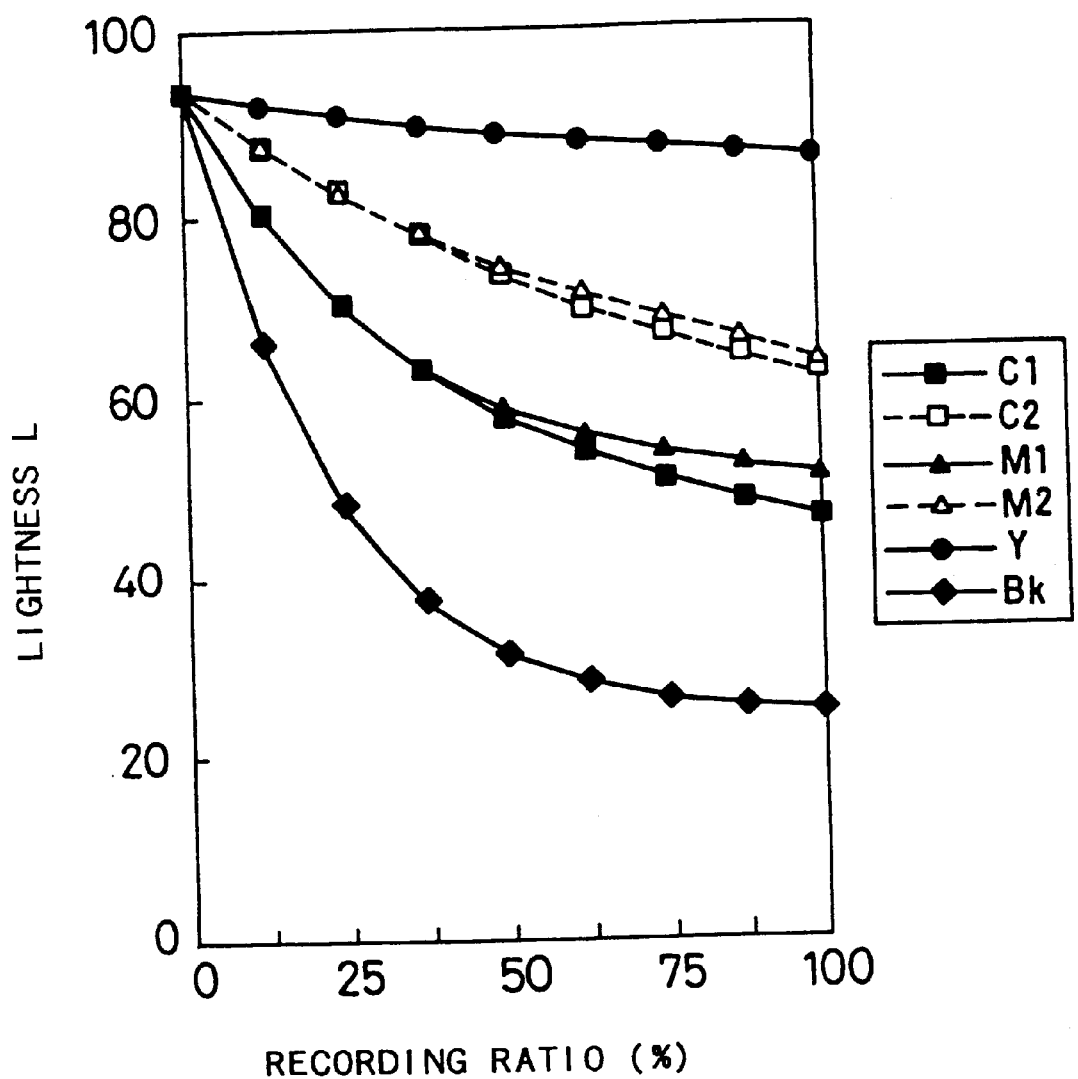
FIG. 10 is a graph showing the lightness plotted against the recording ratio of each color ink.

FIG. 10 is a graph showing the lightness of these color inks. The abscissa of FIG. 10 denotes the recording ratio to the recording resolution of the printer, that is, the proportion of printing dots formed by the ink particles Ip discharged from the nozzles 'n' to the white sheet of paper P. The recording ratio=100 represents the state, in which the whole surface of the sheet of paper P is covered with the ink particles Ip. In this embodiment, the light cyan ink C2 has approximately one quarter the dye density (percent by weight) of the cyan ink C1. The lightness of the light cyan ink C2 at the recording ratio of 100% is equal to the lightness of the cyan ink C1 at the recording ratio of approximately 35%. This relationship is also applicable to the lightness of the magenta ink M1 and the light magenta ink M2. The proportion of recording ratios of different-density inks giving the identical lightness is defined by the beauty of color mixture in case that the two different-density inks are mixed in print. In practice, it is desirable to adjust the proportion in the range of 20% to 50%. This relationship is substantially equivalent to the adjustment of the dye density (percent by weight) of the lower-density ink (light cyan ink C2 or the light magenta ink M2) to almost one fifth to one third the dye density (percent by weight) of the higher-density ink (cyan ink C1 or the magenta ink M1).

Figure 11:
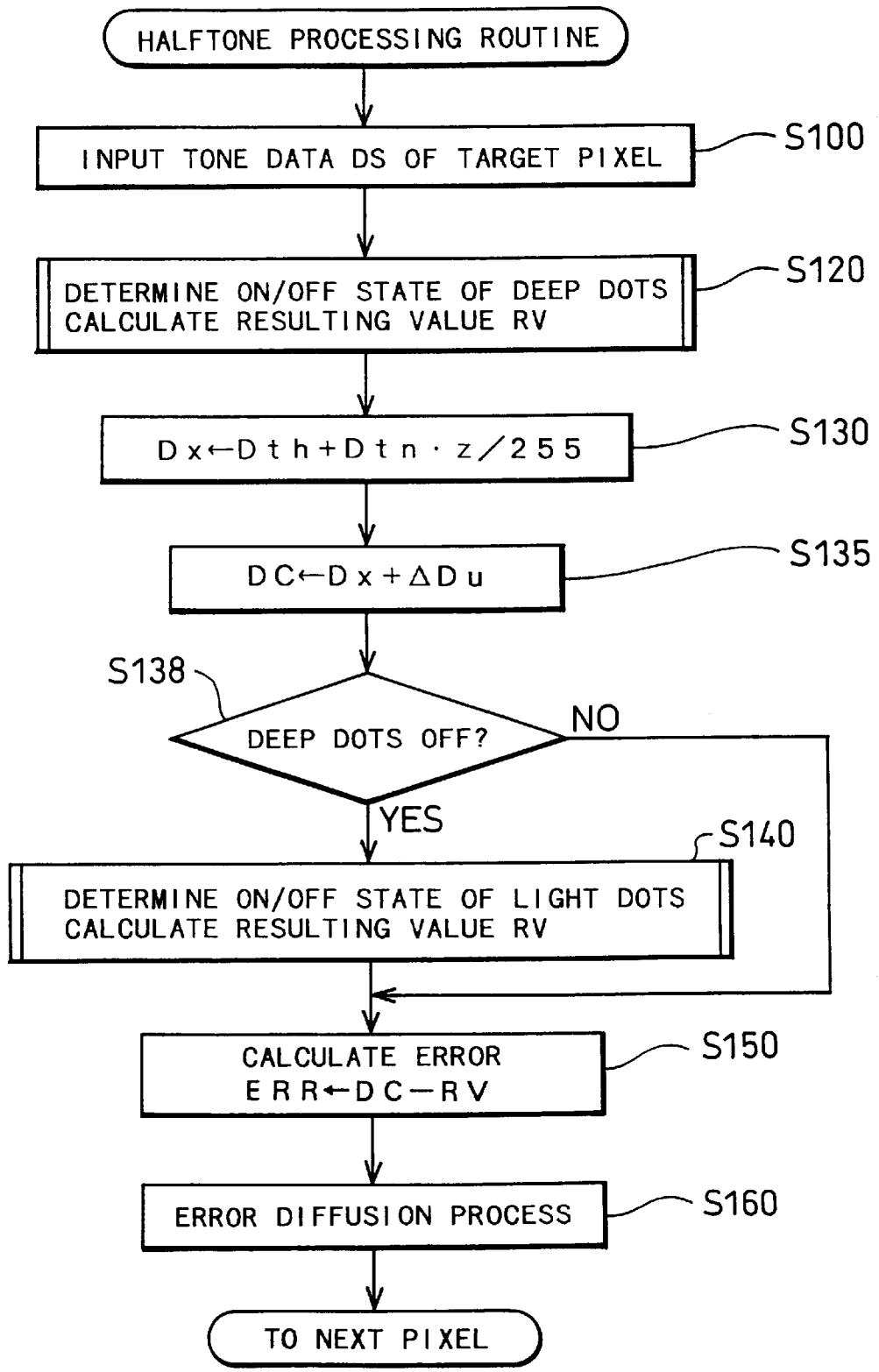
FIG. 11 is a flowchart showing a processing routine executed by the halftone module 99.

The printer 20 of the embodiment carries out the processing in the halftone module 99 of the printer driver 96 and thereby prints images with high-density ink and low-density ink. FIG. 11 is a flowchart showing outline of the processing executed in the halftone module 99. When a printing process starts, pixels are successively scanned from the upper left corner of one image set as the origin. The halftone module 99 receives color-corrected tone data DS (8 bits respectively for C, M, Y, and K) of a target pixel in the order along the scanning direction of the carriage 30 from the color correction module 98 (step S100).

The following description is on the assumption that images are printed only in cyan ink. In the actual state, however, images are printed in multiple colors; deep dots and light dots of magenta are formed by the higher-density magenta ink M1 and the lower-density light magenta ink M2, whereas dots of yellow and dots of black are respectively formed by the yellow ink Y and the black ink K. In case that dots are formed by different color inks in a predetermined area, required control is carried out to realize the favorable color reproduction by color mixture. By way of example, one available control procedure does not allow dots of different colors to be printed at an identical position.

Figure 13:
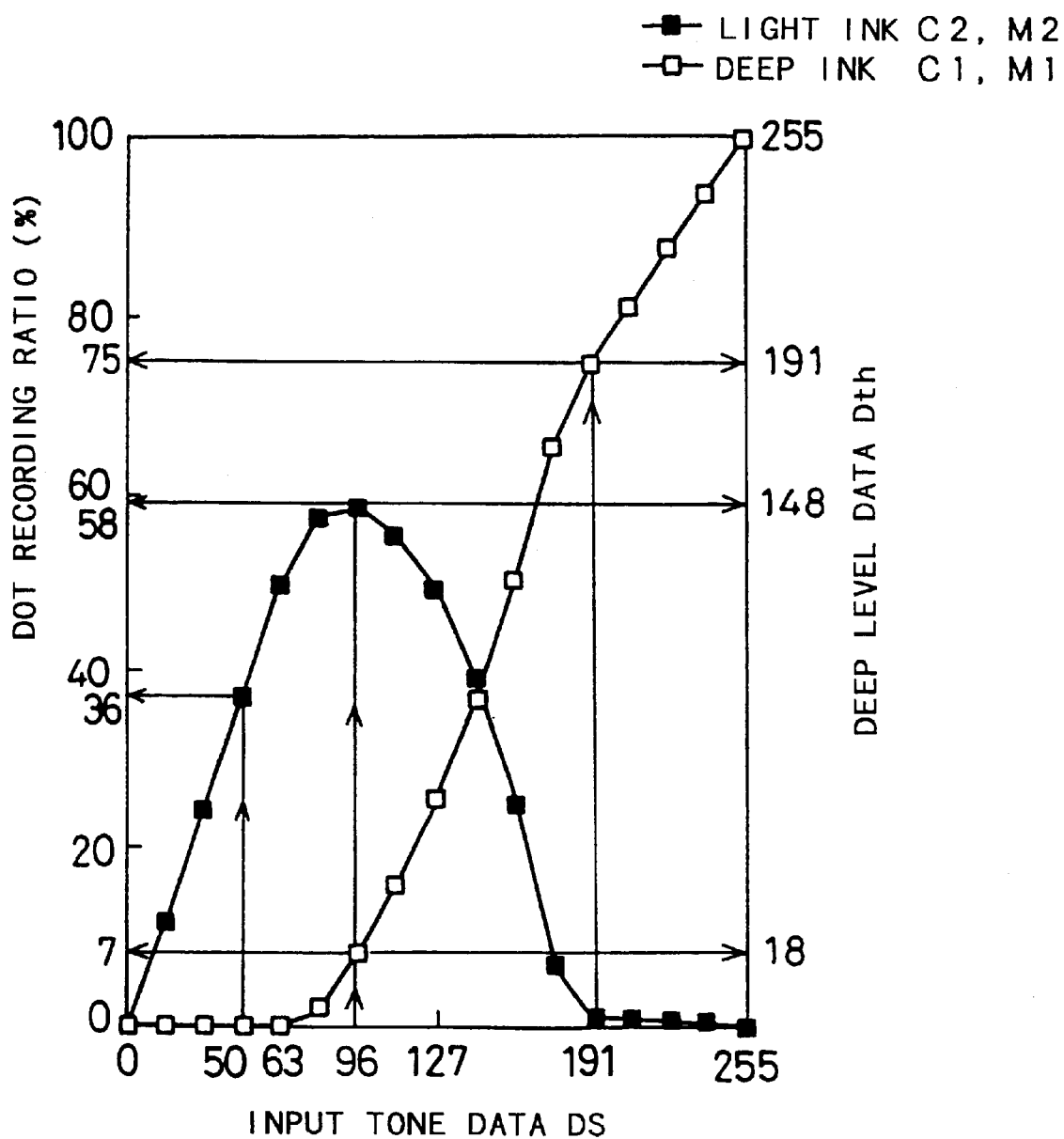
FIG. 13 is a graph showing the relationship between the tone data and the recording ratios of light ink and deep ink in the embodiment.
Figure 14:
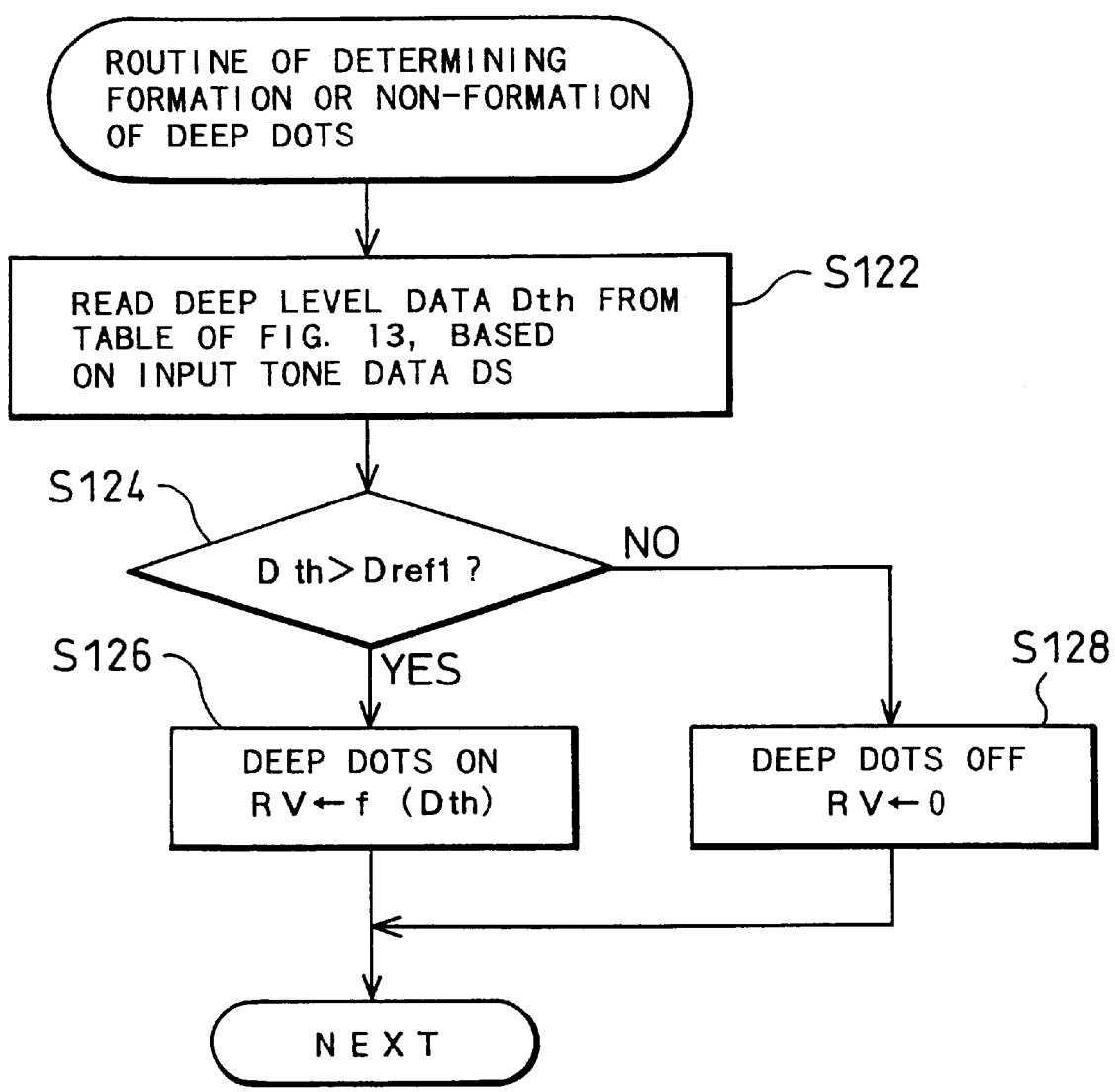
FIG. 14 is a flowchart showing a routine of determining formation or non-formation of deep dots.

The program then determines the on/off state of deep dots, based on the input tone data DS (step S120). The process of determining the on/off state of deep dots follows a routine of determining formation of deep dots shown in the flowchart of FIG. 14. When the program enters the routine of FIG. 14, the halftone module 99 refers to a table shown in FIG. 13 and generates deep level data Dth based on the input tone data DS (step S122). FIG. 13 is a table showing the recording ratios of light ink and deep ink plotted against the tone data of the original image. The tone data DS take the values of 0 to 255 for each color (8 bit-data for each color), and the magnitude of the tone data is accordingly expressed, for example, as 16/256 in the following description. The table of FIG. 13 shows the ratio of deep ink to light ink in a resulting print, and does not unequivocally specify the recording ratios of deep ink and light ink against a certain piece of tone data DS to determine the on/off state of dots by deep ink or light ink in a target pixel. The fundamental technique shown in the flowchart of FIG. 11 first determines the on/off state of deep according to the table of FIG. 13 (step S120) and then determines the on/off state of light dots based on the results of determination for deep dots (step S140). Coincidence between the obtained recording ratio of light dots and data in the table of FIG. 13 is ascribed to the following reason.

The density of an image per unit of area is expressed by the number of deep dots and light dots formed therein. According to the table of FIG. 13, the number of deep dots formed per unit of area is expressed as the ratio to the maximum density, which corresponds to the value '255', and is hereinafter referred to as Ks. In a similar manner, Us represents the number of light dots. In order to enable the density of a resulting image to be identical with tone data DS of an input image, the following equation should be satisfied:

DS=Ks×(Evaluation value of deep dots)/255+Us×(Evaluation value of light dots)/255

Since the evaluation value of deep dots (density of created dots) can be regarded as 255, the table of light dots shown in FIG. 13 depends upon the table of deep dots and the evaluation value of light dots. In the example of FIG. 13, data regarding a point that gives the maximum recording ratio of light dots (tone data=95, deep dot data=18, and light dot data=122) is substituted into the above equation. This specifies the evaluation value of light dots Z as:

95=18×255/255+122×Z/255

The evaluation value of light dots z given by this equation is equal to 160. The evaluation value of deep dots and the evaluation value of light dots are identical with resulting values RV that are used in the flowchart of determining the on/off state of deep dots and light dots discussed later.

Deep level data Dth (right ordinate in FIG. 13) corresponding to a predetermined recording ratio of deep ink is read from the table of FIG. 13, based on the input tone data DS. For example, in case that the input tone data of cyan represents a solid area of 50/256, the recording ratio of the deep cyan ink C1 is equal to 0%, so that the value of deep level data Dth is equal to zero. In case that the input tone data represents a solid area of 95/256, the recording ratio of the deep cyan ink C1 is equal to 7%, so that the value of deep level data Dth is equal to 18. In case that the input tone data represents a solid area of 191/256, the recording ratio of the deep cyan ink C1 is equal to 75%, so that the value of deep level data Dth is equal to 191. In the routine of determining the on/off state of light dots formed by a lighter ink discussed below, the corresponding recording ratios of the light cyan ink C2 are 36%, 58%, and 0%, respectively.

Figure 16:
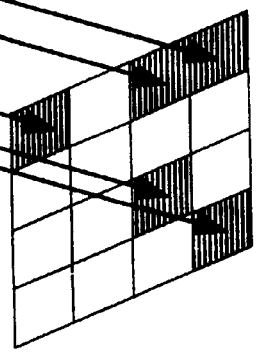
FIG. 16 shows a technique of determining the on/off state of deep dots by the systematic dither method.

The deep level data Dth thus obtained is then compared with a threshold value Dref1 (step S124). The threshold value Dref1 is a reference value for determining whether or not dots of deep ink should be formed in a target pixel, and may be fixed to approximately half the maximum of deep level data Dth. In this embodiment, systematic dither method using a threshold matrix of discrete dither is applied to set the threshold value. The threshold matrix of discrete dither used here is, for example, a wide-range matrix of 64×64 in size (blue noise matrix). Different threshold values Dref1 used for determining the on/off state of deep dots are accordingly set for the respective target pixels. FIG. 16 shows the principle of the systematic dither method. Although the matrix shown in FIG. 16 has the size of 4×4 as a matter of convenience of illustration, the matrix actually used in this embodiment has the size of 64×64. Threshold values (0 to 255) are specified to have no bias of appearance in any 16×16 areas included in the 64×64 matrix. The wide-range matrix effectively prevents occurrence of pseudo-contours. The discrete dither ensures high spatial frequencies of dots determined by the threshold matrix and makes dots sufficiently scattered in any specified area. A concrete example of the discrete dither is a Beyer's threshold matrix. Application of the discrete dither causes deep dots to be sufficiently scattered and realizes a non-biased distribution of deep dots and light dots, thereby improving the picture quality. Another technique, for example, density pattern method or pixel distribution method, may be applied to determine the on/off state of deep dots.

In case that the deep level data Dth is greater than the threshold value Dref1, the program determines the on state of deep dots in the target pixel and calculates a resulting value RV (step S126). The resulting value RV corresponds to the density of the target pixel (evaluation value of deep dots). In the on state of deep dots, that is, when it is determined that dots of high-density ink are to be formed in the target pixel, the value corresponding to the density of the pixel (for example, the value 255) is set as the resulting value RV. The resulting value RV may be a fixed value or set as a function of deep level data Dth.

In case that the deep level data Dth is not greater than the threshold value Dref1, on the contrary, the program determines the off state of deep dots, that is, no formation of dots by high-density ink in the target pixel, and sets the value '0' to the resulting value RV (step S128). Since the white background of the sheet of paper P remains in the place where no dots of high-density ink are formed, the resulting value RV is set equal to zero.

After determining the on/off state of deep dots and calculating the resulting value RV (step S120 in FIG. 11), the program calculates light dot data Dx used for determining the on/off state of light dots (step S130). Corrected data DC is obtained by adding diffusion errors ΔDu diffused from the peripheral processed pixels to the light dot data Dx (step S135). The light dot data Dx is calculated according to the following equation:

$$Dx=Dth\cdot Z/255+Dtn\cdot z/255$$

wherein Dtn denotes light level data read from the table of FIG. 13, based on the tone data DS, Z represents an evaluation value in case of the on state of deep dots, and z denotes an evaluation value in case of the on state of light dots. The light dot data Dx is the sum of the deep level data and the light level data respectively multiplied by weighting coefficients, which depend upon the respective evaluation values. One of the main characteristics of the present invention is that the on/off state of light dots is determined by the light dot data Dx, which is based on both the deep level data and the light level data. Since the evaluation value Z of deep dots is equal to 255, the above equation is rewritten as:

$$Dx=Dth+Dtn\cdot z/255$$

which is actually used to calculate the light dot data Dx (step S130). The evaluation value z of light dots is significantly smaller than the evaluation value Z of deep dots and is set equal to 160 in this embodiment.

Figure 15:
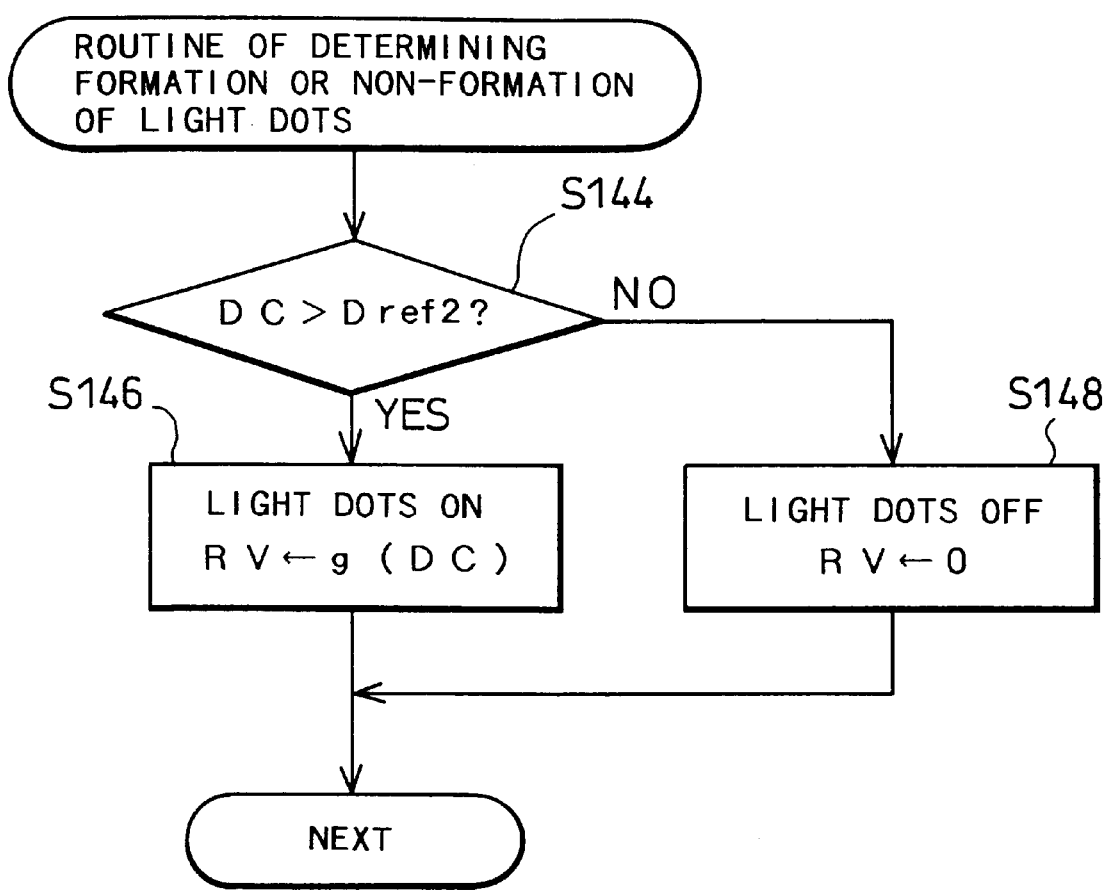
FIG. 15 is a flowchart showing a routine of determining formation or non-formation of light dots.

The corrected data DC is obtained at step S135 by adding the diffusion errors ΔDu to the light dot data Dx, since the error diffusion is carried out with respect to the light dots. In the printing process by the error diffusion method, a density error occurring in a processed pixel is distributed in advance into peripheral pixels near to the processed pixel with predetermined weights. The processing of step S135 accordingly reads the corresponding errors and causes the errors to affect the target pixel to be printed next. FIG. 15 illustrates a process of distributing the error occurring in a processed pixel PP, for which the on/off state of light dots has been determined, into peripheral pixels with specified weights. The density error is distributed into several pixels after the processed pixel PP in the scanning direction of the carriage 30 and in the feeding direction of the sheet of paper P with predetermined weights (¼, ⅛, 1/16).

Figure 17:
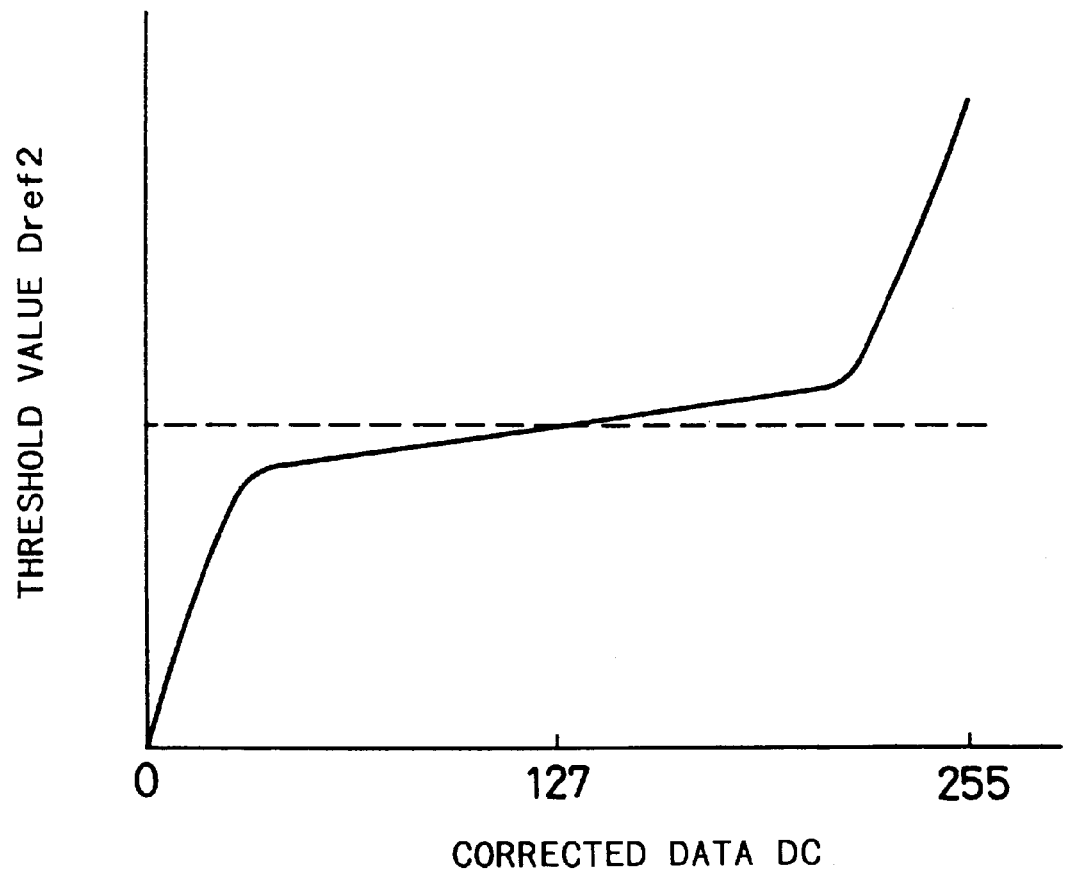
FIG. 17 is a graph showing the threshold value Dref2 plotted against the corrected data DC.

After the calculation of the corrected data DC, it is determined whether or not the pixel is in the off state of deep dots (that is, no dots of the cyan ink C1 are formed in the pixel) (step S138). In case of the off state of deep dots, that is, in case of no formation of deep dots, the program determines the on/off state of low-density dots, that is, dots by the light cyan ink C2 (hereinafter referred to as light dot) (step S140). The process of determining the on/off state of light dots follows a routine of determining formation of light dots shown in the flowchart of FIG. 16. In this example, the error diffusion method is adopted to determine the on/off state of light dots, that is, formation of dots by the light cyan ink C2. The tone data DC corrected according to the concept of error diffusion is compared with a threshold value Dref2 for light dots (step S144). The threshold value Dref2 is a reference value for determining whether or not dots should be formed by the low-density, light ink in a target pixel. The threshold value Dref2 may be a fixed value, but is set as a variable varying with the corrected data DC in this example. FIG. 17 shows the relationship between the threshold value Dref2 and the corrected data DC. The threshold value Dref2 is set as a function of the corrected data DC as shown in FIG. 17. This effectively prevents delay of dot formation in the vicinity of the lower limit or upper limit of the tone or turbulence of dot formation (a trail of dots) observed in a certain range in the scanning direction under the condition of an abrupt change in tone in a specified area.

In case that the corrected data DC is greater than the threshold value Dref2, the program determines the on state of light dots and calculates a resulting value RV (evaluation value of light dots) (step S146). The resulting value RV here has a reference value 122 and is corrected by the corrected data DC, although it may be a fixed value. In case that the corrected data DC is not greater than the threshold value Dref2, on the contrary, the program determines the off state of light dots and sets the value '0' to the resulting value RV (step S148).

Figure 18:
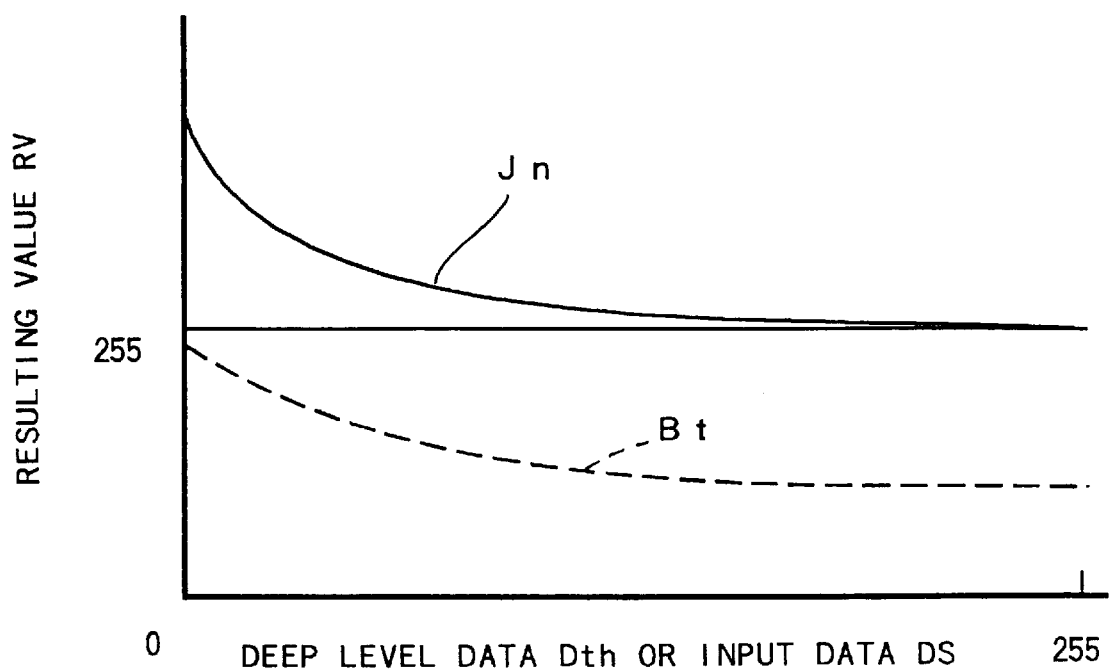
FIG. 18 is a graph for determining the resulting value RV when the on/off state of deep dots or that of light dots is specified.
Figure 19:
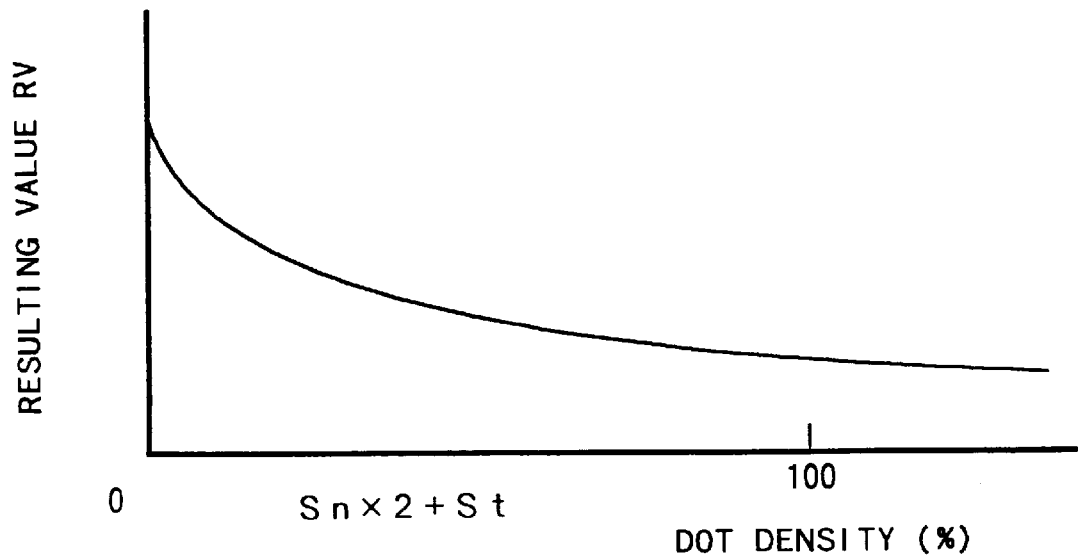
FIG. 19 is a graph for determining the resulting value RV of light dots based on the density Sn of deep dots and the density St of light dots.

A variety of techniques are applicable to determine the resulting value RV. One available technique determines the resulting value RV of deep dots based on the deep level data Dth, while determining that of light dots based on the input data DS. A solid line Jn in FIG. 18 shows a function applicable to determine the resulting value RV of deep dots, and a broken line Bt in FIG. 18 shows a function applicable to determine the resulting value RV of light dots. Another possible procedure determines the resulting value RV of the second dots which are subjected to the later determination of the on/off state (the light dots in this embodiment), based on data regarding both the deep dots and the light dots. By way of example, the resulting value RV of the light dots may be determined as a function of $Sn\times\alpha+St$ ($\alpha$ is a coefficient greater than 1), where St and Sn respectively denote a density of light dots and a density of deep dots, as shown in FIG. 19.

After determining the on/off state of light dots and calculating the resulting value RV (step S140 in FIG. 11), the program calculates an error (step S150). The error is obtained by subtracting the resulting value RV from the corrected data DC. In case that neither deep dots nor light dots are formed, the resulting value RV is equal to zero and the corrected data DC is set to the error ERR. In this case, no density to be realized is obtained in the target pixel, so that the density is specified as the error. In case that either deep dots or light dots are formed, on the other hand, a value corresponding to the created dots is set to the resulting value RV, so that the difference between the corrected data DC and the resulting value RV is specified as the error ERR.

Figure 12:
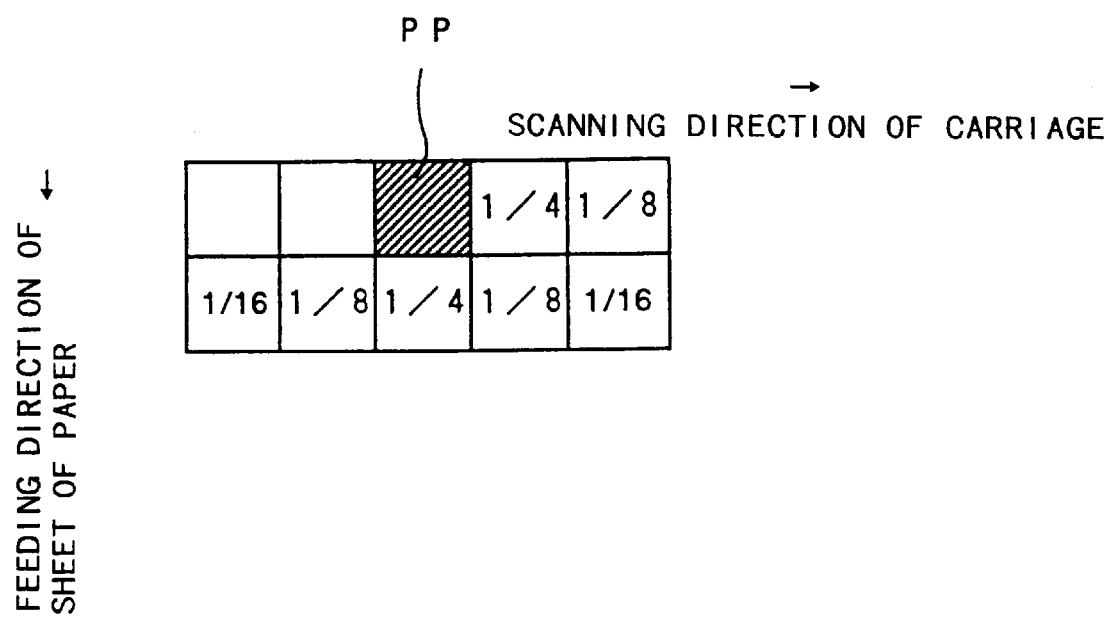
FIG. 12 shows weights added to the peripheral pixels, into which an error is distributed in the process of error distribution.

The program subsequently carries out error diffusion (step S160). The error obtained at step S150 is distributed into peripheral pixels around the target pixel with predetermined weights (see FIG. 12). After the error diffusion process, the program goes to a next pixel and repeats the processing of steps S100 through S160 for the next pixel.

FIG. 20 shows the process of recording light dots and deep dots with respect to the cyan ink C1 and the light cyan ink C2. In the range of low tone data (in the range of tone data=0/256 to 63/256 in this embodiment), dots of only the light cyan ink C2 are formed as shown in FIGS. 20a and 20b. The proportion of light dots existing in a predetermined area increases with an increase in tone data.

Figure 20A:
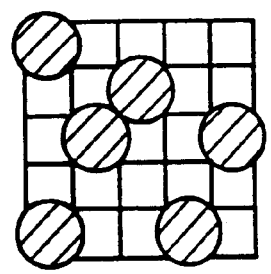
FIG. 20 shows the process of recording dots by a higher-density ink and a lower-density ink.
Figure 20B:
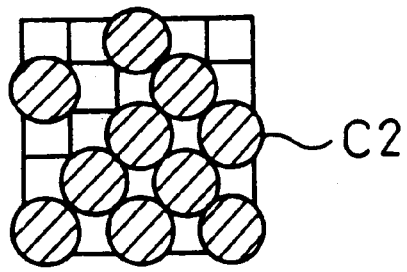
Figure 20C:
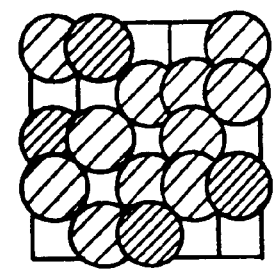
Figure 20D:
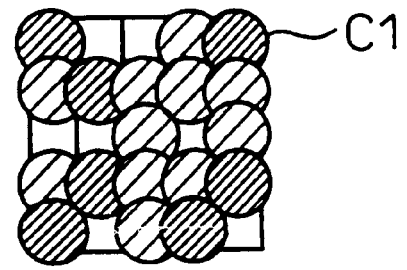
Figure 20E:
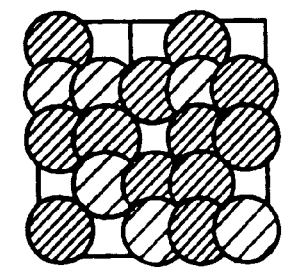

In the range of tone data exceeding a predetermined value (in the range exceeding 64/256 in this embodiment), formation of deep dots starts and gradually increases while the proportion of light dots still increases as shown in FIG. 20c. In the range of higher tone data (in the range exceeding 95/256 in this embodiment), the proportion of deep dots increases while the proportion of Light dots decreases as shown in FIGS. 20d and 20e.

Figure 20F:
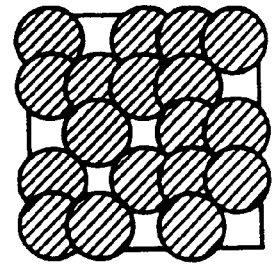
Figure 20G:
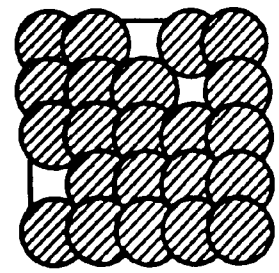

In the range of still higher tone data (in the range exceeding 191/256 in this embodiment), no light dots but only deep dots are formed as shown in FIGS. 20f and 20g.

Figure 20H:
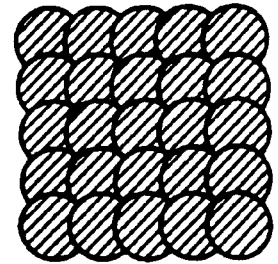
Figure 21A:
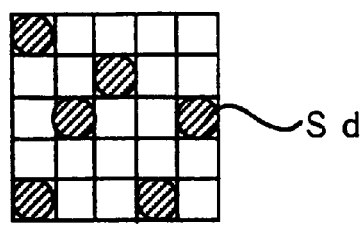
FIG. 21 shows a process of recording dots of different diameters.
Figure 21B:
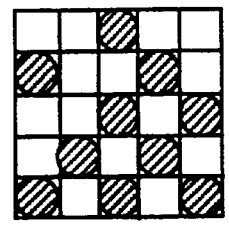
Figure 21C:
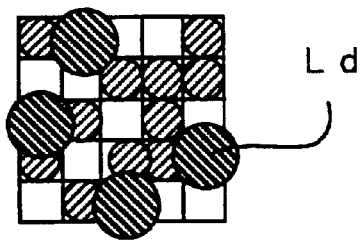
Figure 21D:
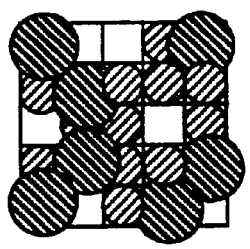
Figure 21E:
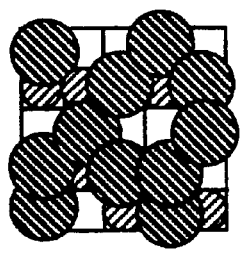
Figure 21F:
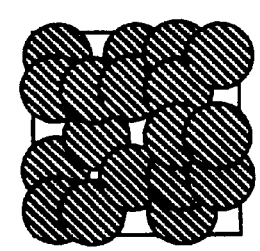
Figure 21G:
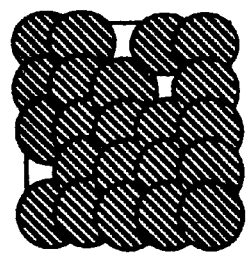
Figure 21H:
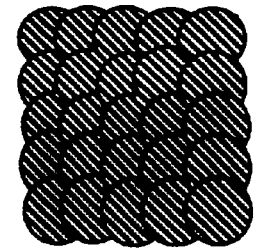

When the tone data reaches the maximum, the recording ratio of deep dots is equal to 100% as shown in FIG. 20h. In this state, the whole surface of the sheet of paper P is covered with the dots of high-density ink (cyan ink C1).

The procedure of the embodiment discussed above first determines whether or not dots are to be formed by the higher-density ink and specifies the resulting value RV according to the on/off state of the deep dots. Only in case of no formation of deep dots, the procedure determines whether or not dots are to be formed by the lower-density ink and specifies the resulting value RV according to the on/off state of the light dots. The systematic dither method is applied to the determination for the deep dots, whereas the error diffusion method is applied to the determination for the light dots. The density of a resulting printed image is thus regulated to minimize the error through the on/off state of the light dots. Since the determination for the deep dots is carried out prior to the determination for the light dots, a natural distribution of deep dots having the excellent tone expression can be realized by adequately setting the relationship between the input data and the deep level data Dth in the table of FIG. 13.

A simple prior art procedure applied to determine the or/off state of deep dots and light dots turns the light dots on when the density of input data is within a predetermined range, and turns the deep dots on when the density of input data is higher than the predetermined range. This procedure may cause a pseudo-contour when the input data is close to the upper limit or the lower limit of this predetermined range. The technique of this embodiment, on the other hand, does not cause any pseudo-contours. Another advantage of the embodiment that successively determines the on/off state of deep dots and light dots is to readily regulate the mixing ratio of the deep dots to the light dots.

In this embodiment, specification of the recording ratios of the light cyan ink C2 and the cyan ink C1 based on the map of FIG. 13 gives the following characteristics:

(1) Only the light cyan ink C2 is recorded in the range of low tone data (the range of 0/256 to 63/256 in this embodiment) In this range, the recording ratio of the light cyan ink C2 monotonously increases with an increase in magnitude of tone data.

(2) Before the recording ratio of the light cyan ink C2, which increases with an increase in input tone data, reaches its maximum (58% in this embodiment), formation of dots by the higher-density cyan ink C1 starts and the recording ratio of the cyan ink C1 gradually increases with an increase in tone data. In this embodiment, formation of dots by the cyan ink C1 starts when the value of input tone data exceeds 63/256. The specific value of tone data giving the maximum recording ratio of dots by the light cyan ink C2 is 95/256 in this embodiment.

(3) When the tone data exceeds the specific value that gives the maximum recording ratio of dots by the light cyan ink C2, the recording ratio of the light cyan ink C2 starts decreasing. The recording ratio of the cyan ink C1, on the other hand, increases substantially in proportion to an increase in tone data. In this embodiment, the recording ratio of the light cyan ink C2 decreases abruptly in the range of tone data exceeding 127/256, and is substantially equal to zero in the range of tone data exceeding 191/256.

(4) In the range of tone data greater than the specific value at which the recording ratio of the light cyan ink C2 becomes substantially equal to zero, the recording ratio of the cyan ink C1 gradually increases to the maximum 100% with an increase in tone data. Compared with the previous range, however, the increase in recording ratio against the increase in tone data shows a slightly gentle slope in this range.

In the printer 20 of the embodiment discussed above, deep dots by the higher-density ink (the cyan ink C1 in the example of FIG. 13) start formation in the range of tone data smaller than the specific value that gives the maximum recording ratio of light dots by the lower-density ink (the light cyan ink C2 in the example of FIG. 13). This structure enables extremely smooth color mixture on the border between the print with light dots and the print with deep dots, thereby ensuring the extremely high quality of printing.

This structure also restricts the maximum recording ratio of dots by the light ink to approximately 60%. No solid state of the light ink in a lower tone range effectively prevents occurrence of pseudo-contours in this tone range. This structure further gives a high degree of freedom to the distribution of dots by the deep ink and ensures natural expression in the tone range around the border where the higher-density ink starts mixing with the lower-density ink.

In the range of tone data greater than the specific value that gives the maximum recording ratio of dots by the light ink, the recording ratio of dots by the light ink abruptly decreases. As the tone data increases, the dots of the light ink are replaced by the dots of the deep ink. The replacement decreases the number of ink dots required for expressing a certain tone. This saves the amount of ink discharged for expressing the tone and thereby reduces the total amount of ink used for printing. The recording ratio of dots by the light ink abruptly decreases and becomes substantially equal to zero, well before the recording rat-o of dots by the deep ink reaches 100% (input data=255). This prevents the light ink from being used wastefully in the process of printing the high-tone image area and decreases the total amount of ink discharged for printing. This structure favorably restricts the amount of ink per unit area in the sheet of paper.

In the first embodiment, two different dots having different densities per unit area are formed by the two inks of the same color but different densities. In accordance with one possible application, three or more inks of the same color but different densities may be applied to the structure of the above embodiment. In this case, the ratio of dye densities of these inks may be specified like a geometric series ($1:n:2 \times n: \ldots$ or as a relationship of like powers ($1:n^2:n^4 \ldots$), wherein $n=2,3, \ldots$ (positive integer of not smaller than 2). The first embodiment applies the systematic dither method to determine the on/off state of deep dots and the error diffusion method to determine the on/off state of light dots. A variety of other known binarization techniques are also applicable to determine the on/off state of deep dots and light dots. Another possible structure gives the priority of determination of the on/off state to the light dots over the deep dots.

Although inks of different densities are used only for cyan and magenta in the embodiment, inks of different densities may also be used for yellow and black. Inks of different densities are not restricted to the combination of C, M, Y, and K but may be applied to another combination. Inks of different densities may be used for special colors, such as gold and silver.

In the first embodiment, dots by the higher-density ink (deep dots) and dots by the lower-density ink (light dots) are formed on the sheet of paper P. Similar effects can, however, be attained by forming two or more different dots in diameter by the same ink having a fixed density. This structure is discussed below as a second embodiment according to the present invention. The size of the dots formed on the sheet of paper P is controlled by regulating the diameter of the nozzle for discharging ink and the intensity of the voltage pulse (that is, the voltage and duration) applied to the piezoelectric element PE. In the second embodiment, for example, the nozzle 62 for the cyan ink C1 and the nozzle 63 for the light cyan ink C2 in the first embodiment are replaced respectively with a nozzle for large-diametral dots and a nozzle for small-diametral dots. The control procedure of the first embodiment is adopted in the second embodiment with slight changes, that is, replacement of deep dots by large-diametral dots and light dots by small-diametral dots. The structure of the second embodiment determines the on/off state of the large-diametral dots according to the input tone data by the dither method and then determines the on/off state of the small-diametral dots based on the error diffusion technique. FIG. 21 shows the process of forming the large-diametral dots and the small-diametral dots.

The second embodiment exerts similar effects as those of the first embodiment, that is, smooth tone expression and easy regulation of the mixing ratio of the large-diametral dots to the small-diametral dots. Another advantage of the second embodiment is that only one ink is required for each color. Formation of the small-diametral dots decreases the amount of ink discharged on the sheet of paper P. This is advantageous from the viewpoint of the ink duty, which represents the allowable amount of ink sprayed per unit area in the sheet of paper P.

The large-diametral dot and the small-diametral dot are not printed at the same position. One preferable structure accordingly uses only one nozzle for printing both the large-diametral dots and the small-diametral dots by varying the intensity of the voltage pulse applied to the piezoelectric clement PE. This structure decreases the number of the nozzles formed in the print head 28 and effectively prevents deviation of the printing positions of the large-diametral dots from those of the small-diametral dots. The structure of varying the dot diameter is also applicable to three or more different dots in diameter. Like the first embodiment, the second embodiment may apply the systematic dither method to determination for the large-diametral dots and the error diffusion method to determination for the small-diametral dots. The determination of the on/off state of the respective dots is, however, not restricted to these techniques, and a variety of other known binarization techniques are also applicable to determine the on/off state of the large-diametral dots and the small-diametral dots. In this embodiment, the priority of determination of the on/off state may be given to the large-diametral dots or alternatively to the small-diametral dots.

Figure 22:
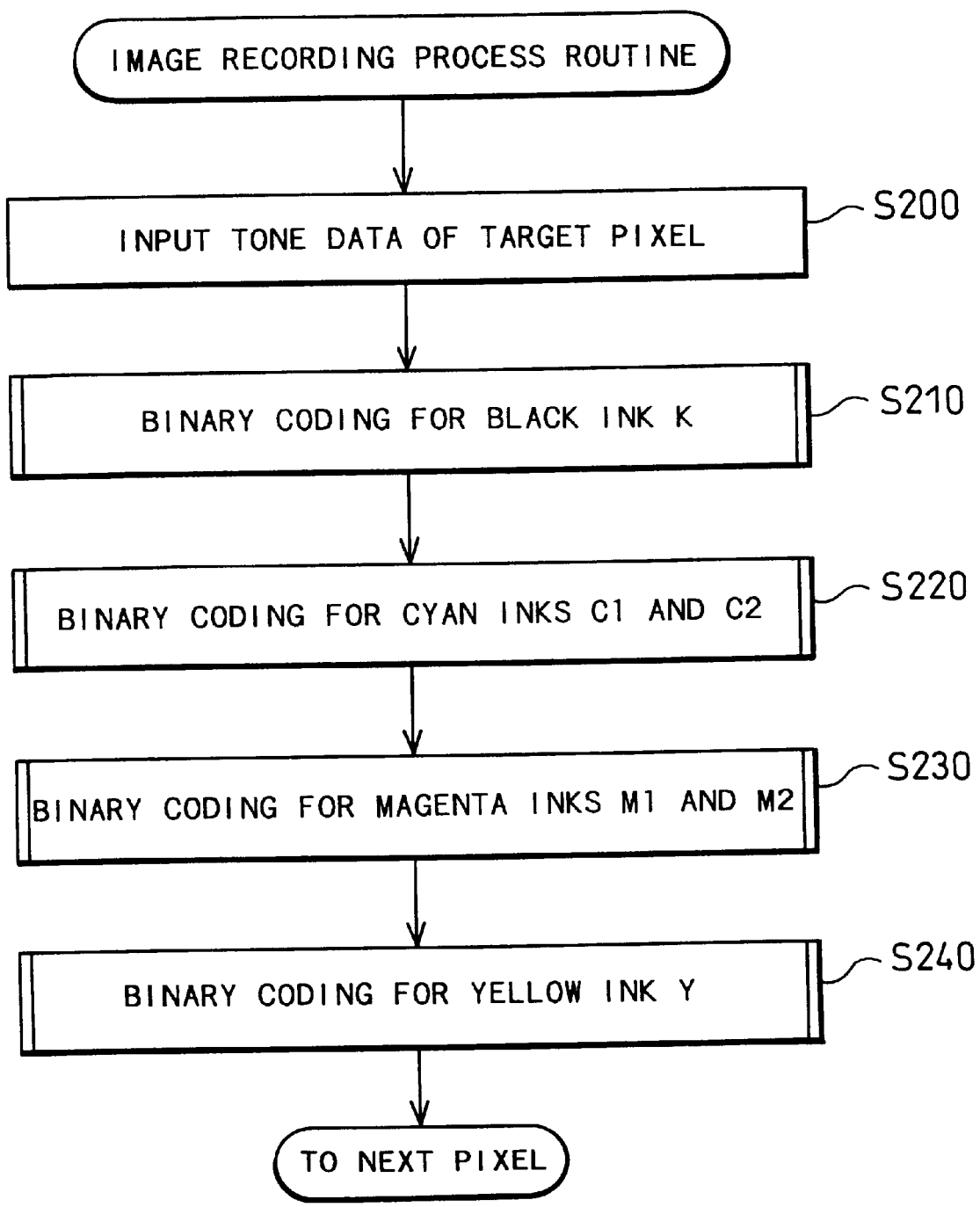
FIG. 22 is a flowchart showing an image recording process routine executed in a third embodiment according to the present invention.

The following describes a third embodiment according to the present invention. A printing system of the third embodiment has the same hardware structure as those of the first and the second embodiments, and can record images with the total of six colors, that is, black ink K, cyan ink C1, light cyan ink C2, magenta ink M1, light magenta ink M2, and yellow ink Y. In the third embodiment, when entering the image recording process routine of FIG. 22, the program first receives tone data of a target pixel (step S200) and executes binary coding for the black ink (step S210). Del:ails of the binarization for black ink executed at step S210 is shown in the flowchart of FIG. 22 and will be discussed later.

After the binary coding for the black ink, the program successively carries out binary coding for the two cyan inks C1 and C2 having different densities (step S220), binary coding for the two magenta inks M1 and M2 having different densities (step S230), and binary coding for the yellow ink Y (step S240). Namely binary coding is executed for the total of six inks K, C1, C2, M1, M2, and Y, with respect to the target pixel.

Figure 23:
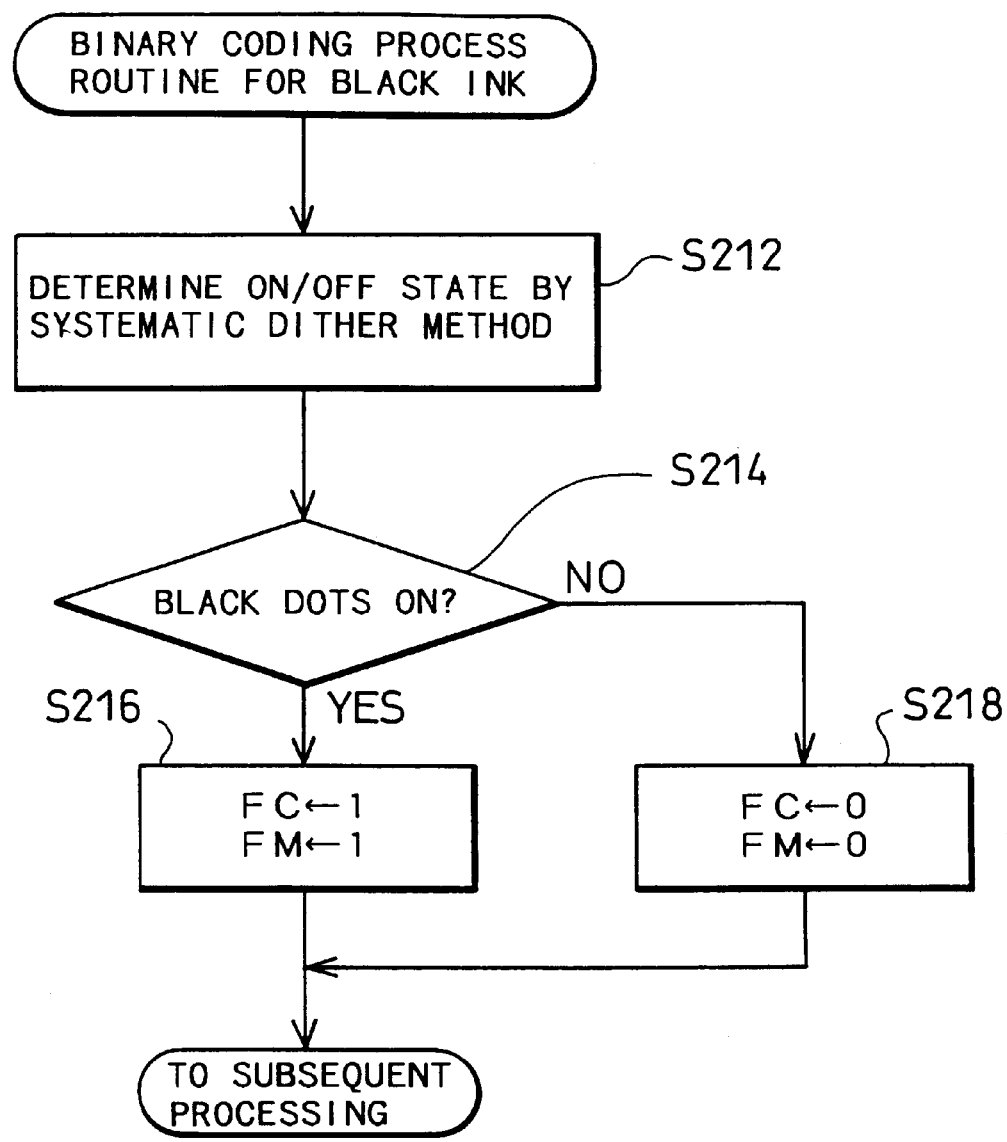
FIG. 23 is a flowchart showing a binary coding process for black ink in the third embodiment.

The systematic dither method, which has been discussed in the first embodiment, is adopted to the binary coding for the black ink as shown in the flowchart of FIG. 23. A wide-range matrix of 64×64 in size (blue noise matrix) is used to realize binarization with favorable dispersibility for the black ink. After binarization for the black ink, that is, determination of the on/off state of dots formed by the black ink (step S212), it is determined whether or not black dots are ON (step S214). In the ON state, that is, in case of formation of dots by the black ink, the value '1' is set to both flags FC and FM (step S216). In the OFF state, that is, in case of no formation of dots by the black ink, on the other hand, the value '0' is set to both the flags FC and FM (step S218). These flags FC and FM representing the on/off state of dots by black ink are referred to in the binary coding process for cyan ink and magenta ink (steps S220 and 230).

Figure 24:
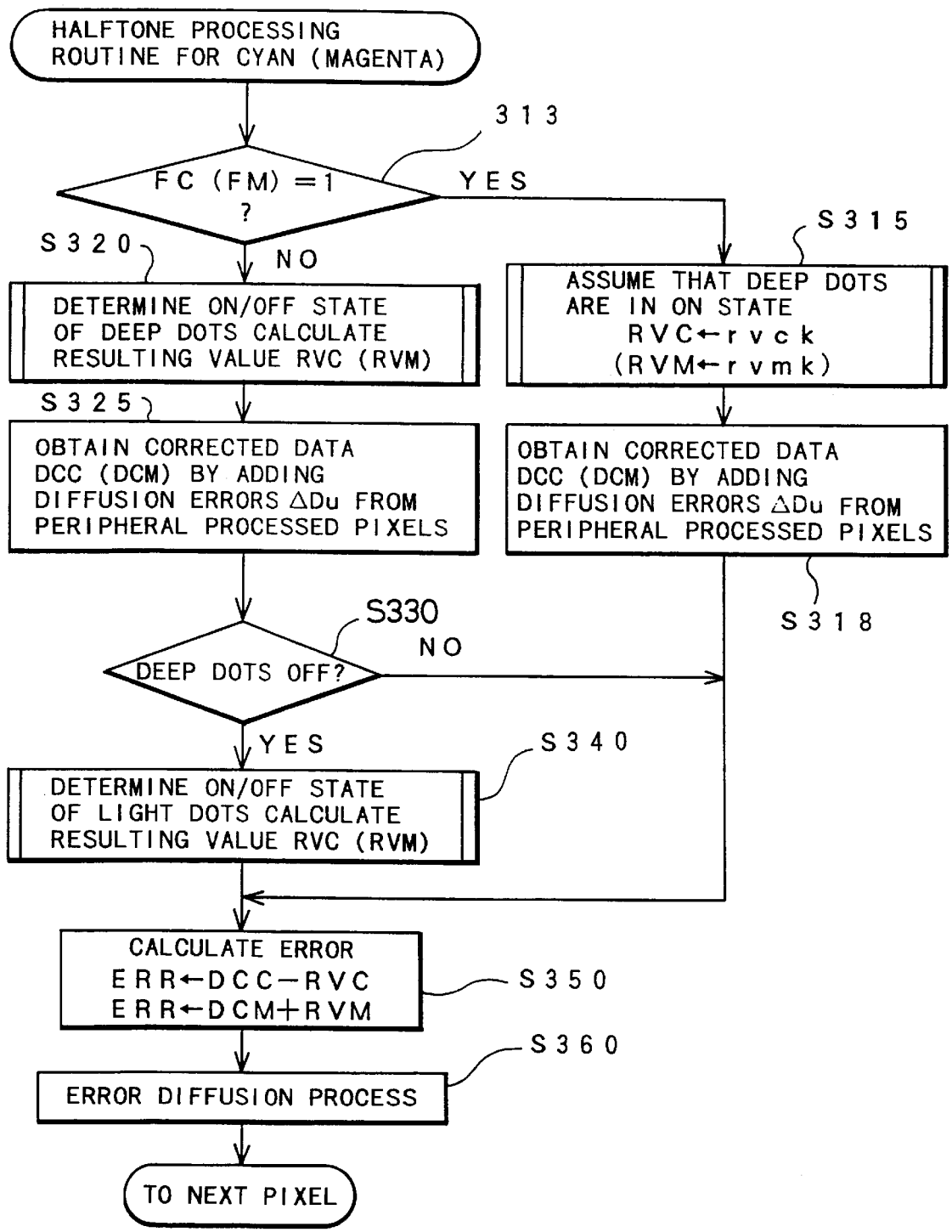
FIG. 24 is a flowchart showing a halftone processing routine for cyan (magenta)

The flowchart of FIG. 24 shows details of the halftone processing for cyan ink and magenta ink (steps S220 and S230). The halftone processing for cyan or magenta includes similar steps to those of the halftone processing discussed in the first embodiment (see FIG. 11). Steps of FIG. 24 identical with or similar to those of FIG. 11 have like numerals in the lower two places. The flowchart of FIG. 24 mainly relates to the processing for cyan ink, and that for magenta ink is shown in parentheses. When the program enters the routine of FIG. 24, it is first determined whether or not the flag FC is equal to one (step S313). In the processing routine for magenta ink, it is here determined whether or not the flag FM is equal to one. In case that the flag FC (or FM) is not equal to one, the program recognizes the off state of dots by the black ink in the binary coding process for black ink (FIG. 23). Like the first embodiment, the program then determines the on/off state of deep dots (the cyan ink C1 or the magenta ink M1) and calculates a resulting value RVC (RVM) (step S320). Corrected data DCC for cyan (DCM for magenta) is obtained by adding diffusion errors ΔDu diffused from the processed pixels, which are in proximity to a target pixel (step S325).

In case that the dots by the black ink are ON in the binary coding process for black ink (FC=FM=1), on the other hand, the program considers deep dots formed by the cyan ink C1 (magenta ink M1) to be also in the on state irrespective of the input tone data, and calculates the resulting value RVC (RVM) (step S315). When dots are formed by the black ink K, it can be thought that cyan and magenta exist in black ink according to the concept of subtractive mixture of color stimuli. There is accordingly no necessity of newly forming dots of cyan or magenta ink upon dots of black ink. The program thus considers dots by the cyan ink C1 and magenta ink M1 to be also in the on state and sets a predetermined value (rvck or rvmk) to the resulting value RVC (RVM). Like step S325, the program obtains corrected data DCC for cyan (DCM for magenta) by adding diffusion errors ΔDu diffused from the processed pixels, which are in proximity to a target pixel (step S318).

In case of no formation of dots by the black ink K (when FC=FM=0), after obtaining the corrected data DCC (DCM), the program determines whether or not deep dots are in the on state (that is, whether or not dots are formed by the cyan ink C1 or the magenta ink M1) (step S330). In case that no deep dots are formed, the program determines the on/off state of low-density dots (hereinafter referred to as light dots), that is, dots formed by the light cyan ink C2 (or the light magenta ink M2) (step S340). The process of determining the on/off state of light dots is similar to that of the first embodiment (FIG. 15) and thus not specifically illustrated here. In this embodiment, the error diffusion method is adopted to determine formation of light dots by the light cyan ink C2 (or the light magenta ink M2). In accordance with a concrete procedure, the tone data DCC (DCM) corrected according to the concept of error diffusion is compared with a threshold value Dref2 for light dots. The threshold value Dref2 is a reference value for determining whether or not dots should be formed by the lower-density, light ink in a target pixel.

In case that the corrected data DCC (DCM) is greater than the threshold value Dref2, the program determines the on state of light dots and calculates a resulting value RVC (RVM), which corresponds to an evaluation value of light dots. In case that the corrected data DCC (DCM) is not greater than the threshold value Dref2, on the other hand, the program determines the off state of light dots and sets the value '0' to the resulting value RVC (RVM).

After determining the on/off state of light dots and calculating the resulting value RVC (RVM) (step S340), the program calculates an error (step S350). The error is obtained by subtracting the resulting value RVC (RVM) from the corrected data DCC(DCM). In case that neither deep dots nor light dots are formed, the resulting value RVC (RVM) is equal to zero and the corrected data DCC (DCM) is set to the error ERR. In this case, no density to be realized is obtained in the target pixel, so that the density is specified as the error ERR. In case that either deep dots or light dots are formed, on the other hand, a value corresponding to the created dots is set to the resulting value RVC (RVM), so that the difference between the corrected data DCC (DCM) and the resulting value RVC (RVM) is specified as the error ERR. When dots are formed by black ink, the structure of the embodiment calculates the resulting value RVC (RVM) and obtains the corrected data DCC (DCM) on the assumption that deep dots of cyan and magenta are in the on state (formed), prior to the processing of and after step S350. In case that dots are formed by black ink in a target pixel, the structure of the embodiment does not form dots of cyan or magenta ink therein, but sets the predetermined value rvck (rvmk) to the resulting value RVC (RVM), prior to calculation of the error (step S350).

After the calculation of the error, the process of error diffusion is carried out (step S360). The error ERR obtained at step S350 is distributed into peripheral pixels around the target pixel with predetermined weights (see FIG. 12 in the first embodiment). After the error diffusion process, the program goes to a next pixel and repeats the processing of steps S313 through S360 for the next pixel. The subsequent binary coding process for yellow ink (step S240) is different from the binary coding process for cyan and magenta inks (steps S220 and S230) and is based on the systematic dither method. The binary coding process for yellow ink utilizes the same threshold matrix as that used in the binary coding process for black ink. In case that dots are formed by black ink, no dots should be formed by yellow ink.

In the process of recording a multi-color image with a plurality of inks including black ink, when dots are formed by black ink, the structure of this embodiment considers dots to be also formed by cyan ink and magenta ink and does not newly form dots of cyan and magenta in a target pixel. Furthermore no dots are formed by yellow ink in the target pixel. The structure of the embodiment prevents inks from being discharged wastefully, thereby reducing the total amount of inks consumed. This is favorable from the aspect of restricted amount of ink sprayed against the sheet of paper (ink duty). In case that dots are formed by black ink, the structure of the embodiment calculates the resulting values RVC and RVM for cyan ink and magenta ink on the assumption that dots are also formed by cyan ink and magenta ink. In the on state of dots by black ink, dots of cyan and magenta are not generally observed in the vicinity of the black dots. In an area where the respective color inks are sparsely recorded, for example, it is rather difficult to record dots by cyan ink and magenta ink as well as dots by light cyan ink and light magenta ink in the vicinity of dots by black ink. This favorably improves granularity of resulting images.

Although the above embodiment regards the relationship between black ink and cyan and magenta inks, the principle of the embodiment is not restricted to cyan or magenta inks but is applicable to any chromatic color inks, such as yellow ink. The principle of the embodiment is also applicable to another combination of inks discharged from the head, instead of the combination of CYM. The achromatic color ink may be a lower-density ink, such as gray ink, other than black ink used in the above embodiment. In case that the achromatic color ink having lower density is used or in case that the blotting state of paper is varied, it is fair to change the resulting value RV when dots are formed by the achromatic color ink.

Figure 25:
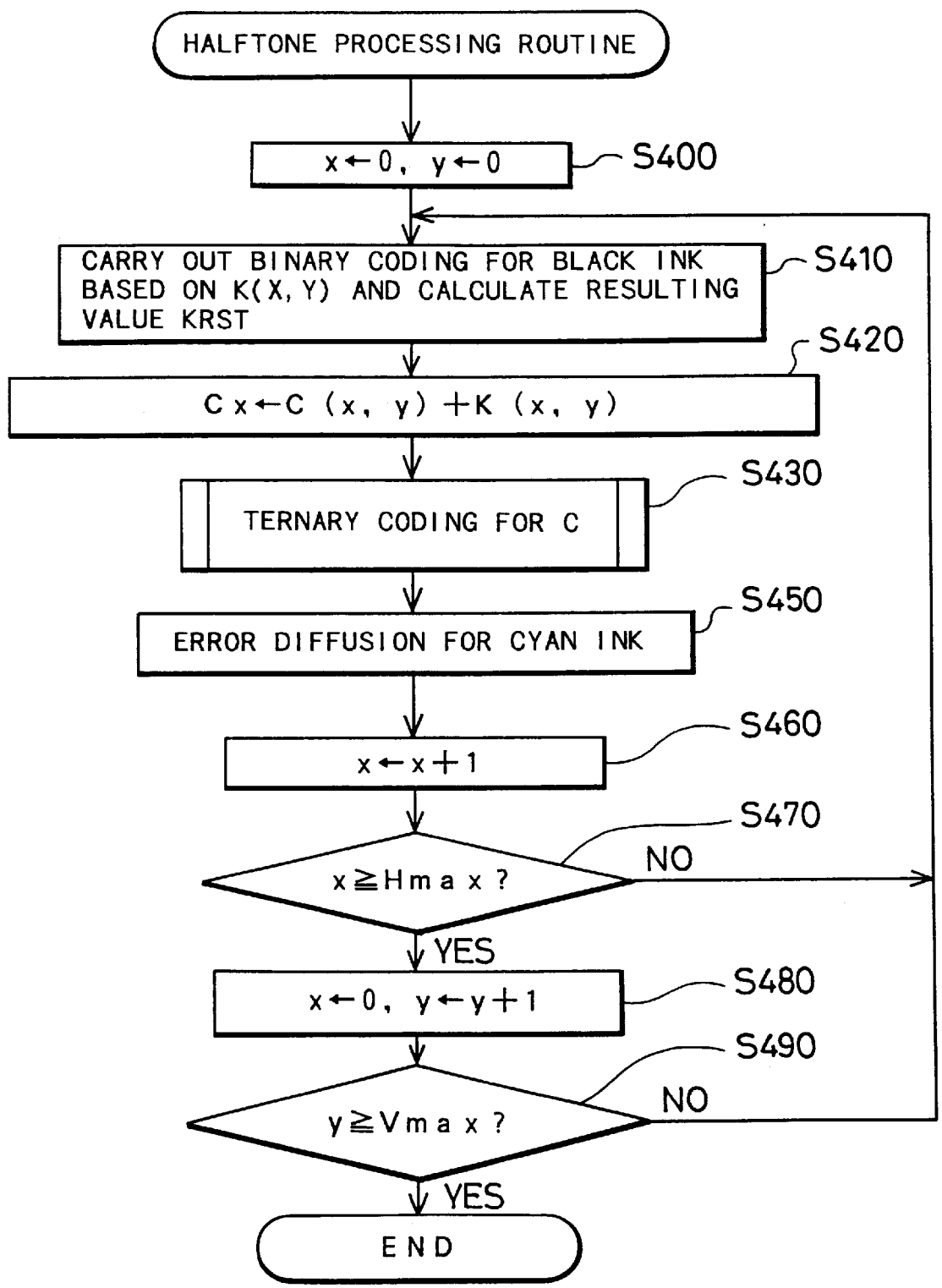
FIG. 25 is a flowchart showing a halftone processing routine executed in a fourth embodiment according to the present invention.
Figure 26:
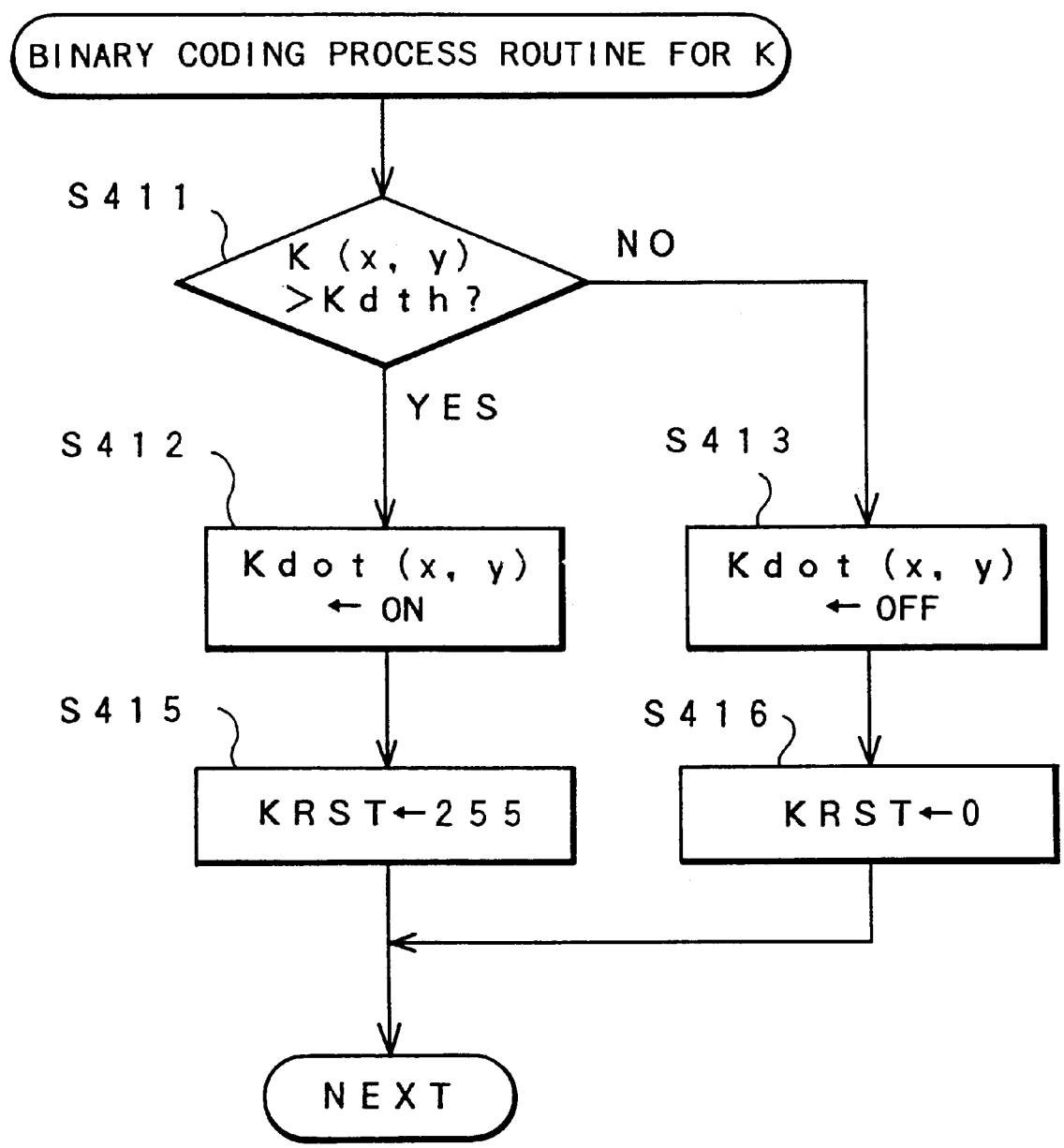
FIG. 26 is a flowchart showing a binary coding process for black ink in the fourth embodiment.
Figure 27:
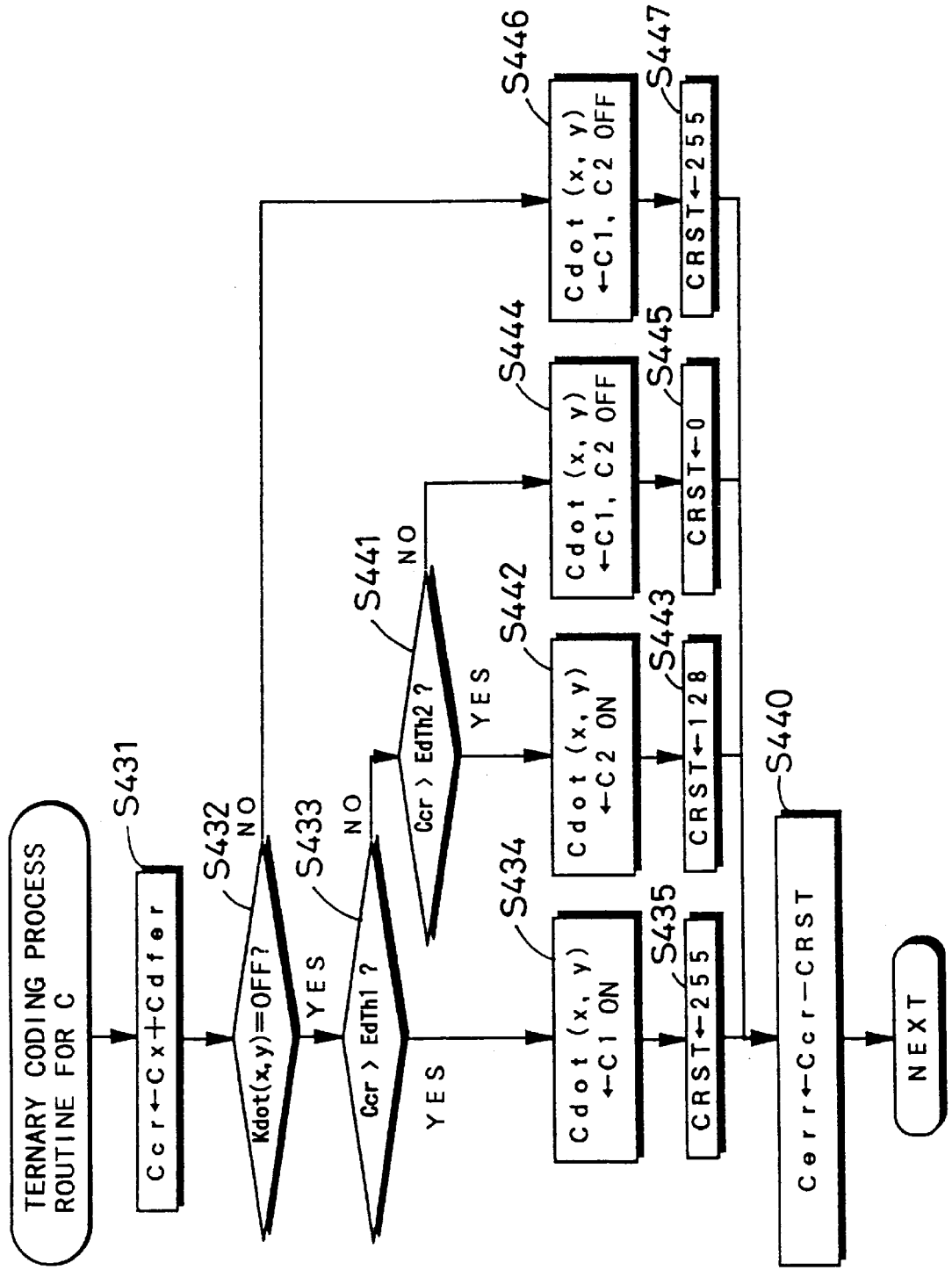
FIG. 27 is a flowchart showing a ternary coding process for the cyan component in the fourth embodiment.

The following describes a fourth embodiment according to the present invention. Like the third embodiment, the structure of the fourth embodiment makes the results of determination of formation or non-formation of dots by black ink reflect upon formation of dots by cyan ink and magenta ink. The only difference from the third embodiment is the technique of reflection. The flowcharts of FIGS. 25 through 27 show the halftone processing carried out in the fourth embodiment. Although the description refers to the determination of formation or non-formation with respect to only the dots by black ink and the dots by cyan ink, similar processing is carried out for magnet ink.

When the program enters the processing routine of FIG. 25, the position of a target pixel is initialized (step S400). A concrete procedure sets the value '0' to both variables x and y, wherein x and y respectively represent the position in the horizontal direction and the position in the vertical direction. The program then carries out the binary coding process for black ink based on a density K(x,y) of the achromatic color in the target pixel and obtains a resulting value KRST (step S410). The systematic dither method is applied to the binary coding process of black ink as discussed previously. The flowchart of FIG. 26 shows the outline of the processing according to the systematic dither method. The density K(x,y) of the achromatic color is compared with a threshold value Kdth read from a threshold matrix of discrete dither prepared in advance (step S411). When K(x,y) is greater than the threshold value, the program determines formation of dots by black ink and turns Kdot(x,y) on (step S412). Otherwise the program turns Kdot(x,y) off (step S413). The resulting value is set equal to 255 in case of formation of dots by black ink and equal to 0 in case of non-formation of dots by black ink (steps S415 and S416).

After the binary coding process for black ink, the program obtains modified data Cx for cyan (step S420). The modified data Cx is obtained by adding the tone data K(x,y) of black ink to tone data C(x,y) of the cyan component in the target pixel. Addition of the tone data of black ink to obtain the modified data Cx for the cyan component makes it difficult to form dots of cyan ink in the place where dots are generally formed by black ink (that is, in the place having a large K(x,y) value). A weighting coefficient KCW may be used to calculate the modified data Cx as expressed below:

$$Cx=C(x,y)+K(x,y) \cdot KCW$$

Although the weighting coefficient KCW is set equal to one in this embodiment, the weighting coefficient KCW may be smaller than or greater than one. The weighting coefficient KCW smaller than one makes it easy to form dots of cyan ink on the average. The weighting coefficient KCW greater than one, on the other hand, makes it difficult to form dots of cyan ink on the average.

After correcting the tone data regarding the cyan component (step S420), the program carries out ternary coding for cyan ink (step S430). The flowchart of FIG. 26 shows details of the ternary coding process for cyan ink. In brief, the on/off state of dots by the cyan ink C1 and the light cyan ink C2 is determined, based on diffusion error-corrected data Ccr for the cyan component. This ternary coding process will be discussed after the general procedure shown in the flowchart of FIG. 25.

After the ternary coding for the cyan component, an error occurring for the cyan component is diffused into the peripheral pixels (step S450). The ternary coding process results in formation of dots by the higher-density cyan ink C1, formation of dots by the lower-density light cyan ink C2, or no formation of any dots. In any case, there generally exists an error from the original tone data regarding the target pixel. The error is distributed into the peripheral pixels with some weights specified in FIG. 12 of the first embodiment.

The program then increments the variable x representing the position in the primary scanning direction (moving direction of the head) by one (step S460), and subsequently determines whether or not the variable x representing the position in the primary scanning direction exceeds an end Hmax in the primary scanning direction (step S470). In case that the variable x does not exceed the end Hmax in the primary scanning direction, the program returns to step S410 and repeats the processing of steps S410 through S470. In case that the variable x exceeds the end Hmax in the primary scanning direction, on the contrary, the program initializes the variable x to zero and increments the variable y representing the position in the secondary scanning direction (feeding direction of sheet of paper) by one (step S480). It is subsequently determined whether or not the variable y representing the position in the secondary scanning direction exceeds an end Vmax of the sheet of paper (step S490). When the variable y does not exceed the end Vmax, the program returns to step S410 and repeats the processing of steps S410 through S490.

Referring to FIG. 27, the ternary coding process for the cyan component is discussed. When the program enters the routine of FIG. 27, corrected data Ccr for the cyan component is obtained by adding a diffused error Cdfer processed at step S450 to the modified data Cx obtained at step S420 in the flowchart of FIG. 25 (step S431). As discussed above, the modified data Cx is obtained by adding the tone data of black ink to the tone data C(x,y) of the cyan component in the target pixel. The corrected data Ccr is given by adding the error diffused from the peripheral pixels to the modified data Cx and thereby represents the density of cyan ink to be realized in the target pixel. It is then determined whether or not dots are formed by black ink in the target pixel. When Kdot(x,y) is off, that is, when no dots are formed by black ink, the corrected data Ccr is compared with a first threshold value EdTh1 (step S433). In case that the corrected data Ccr is greater than the first threshold value EdTh1, the program determines formation of deep dot and turns the dots of the cyan ink C1 on in the target pixel Cdot(x,y) (step S434), in order to realize the high density in the target pixel. In the on state of deep dots, a resulting value CRST for cyan ink is set equal to 255 (step S435). The program then specifies the difference between the corrected data Ccr and the resulting value CRST as a density error Cerr (step S440). The density error Cerr is a quantized error diffused into the peripheral pixels according to the error diffusion process (step S450 in the flowchart of FIG. 25).

In case that the corrected data Ccr is determined to be not greater than the first threshold value EdTh1 at step S433, on the other hand, the program further compares the corrected data Ccr with a second threshold value EdTh2, which is smaller than the first threshold value EdTh1 (step S441). When the corrected data Ccr is not greater than the first threshold value EdTh1 but is greater than the second threshold value EdTh2, the program determines formation of light dots, in order to realize the required density in the target pixel. The concrete procedure sets the light cyan ink C2 in the on state for the pixel Cdot (x,y) (step S442). In the on state of light dots, the resulting value CRST is set equal to 128 (step S443). In case that the corrected data Ccr is determined to be not greater than the second threshold value EdTh2, the program determines no formation of either deep dots or light dots and sets both the cyan ink C1 and the light cyan ink C2 in the off state for the pixel Cdot(x,y) (step S444). In the off state of both deep dots and light dots, the resulting value CRST is set equal to zero (step S445).

When no dots are formed by black ink in the target pixel (step S432), the program carries out the ternary coding process for the cyan component and forms either of the deep dots C1 and the light dots C2 or does not form any dots. When dots are formed by black ink in the target pixel, on the other hand, the program proceeds to step S446. The program determines no formation of dots by the cyan ink C1 or the light cyan ink C2 (step S446), while setting the resulting value CRST equal to 255 (step S447). Since dots have already been formed by black ink, the processing does not form any dots of the cyan component but sets the resulting value CRST on the assumption that deep dots of cyan are formed.

After determining formation or non-formation of deep dots and light dots (steps S434, S442, S444, and S446) and setting the resulting value CRST (steps S435, S443, S445, and S447), the program calculates the density error (step S440) as discussed previously.

In the fourth embodiment discussed above, formation or non-formation of dots by black ink affects formation of deep dots and light dots by cyan ink. Formation of dots by black ink makes it difficult to form dots by cyan ink in the vicinity of the black dots. Even when black ink and cyan ink (or magenta ink) independently have high dispersibility, the structure of the fourth embodiment effectively prevents dots of cyan ink from being formed adjacent to dots of black ink, thereby solving the problem of obvious granularity. Since dots can be recorded by both higher-density ink and lower-density ink for cyan and magenta in this embodiment, light dots are generally formed under such conditions if any dots should be formed. This attains the extremely high quality of resulting images.

The following discusses the reason why the resulting value CRST for cyan ink is set equal to 255 at step S447 in the above embodiment, irrespective of non-formation of dots by cyan ink. In this embodiment, the modified data Cx for cyan ink is obtained by adding the tone data K(x,y) of black ink to the tone data C(x,y) of cyan ink at step S420 in the flowchart of FIG. 25. The corrected data Ccr is accordingly calculated at step S431 in the flowchart of FIG. 27 as:

$$Ccr = Cx + Cdfer$$
$$= C(x, y) + K(x, y) + Cdfer$$

When dots are formed by black ink, the value '255' is set to the resulting value CRST for cyan ink at step S447. The density error Cerr obtained by subtracting the resulting value CRST from the corrected data Ccr is accordingly expressed as:

$$Cerr = Ccr - CRST$$
$$= C(x, y) + K(x, y) - CRST + Cdfer$$

In case that dots are formed by black ink, the processing sets the resulting value CRST for cyan ink equal to 255 without carrying out the determination of formation or non-formation of dots by cyan ink. In this case, the resulting value CRST reflects upon the resulting value in case of formation of dots by black ink. Namely it is regarded as:

$$K(x,y) - CRST = Ker$$

When dots are formed by black ink, the error with respect to the black ink reflects upon formation of dots by cyan ink in the vicinity of the black dots at step S450. When no dots are formed by black ink, the resulting value KRST for black ink is generally set equal to zero. The process of adding the tone data K(x,y) of black ink (step S420 in the flowchart of FIG. 25) accordingly corresponds to the process of adding the density error for the black ink. As in the case of formation of dots by black ink, the on/off state of dots by black ink thus reflects upon the on/off state of peripheral dots by cyan ink.

Figure 28:
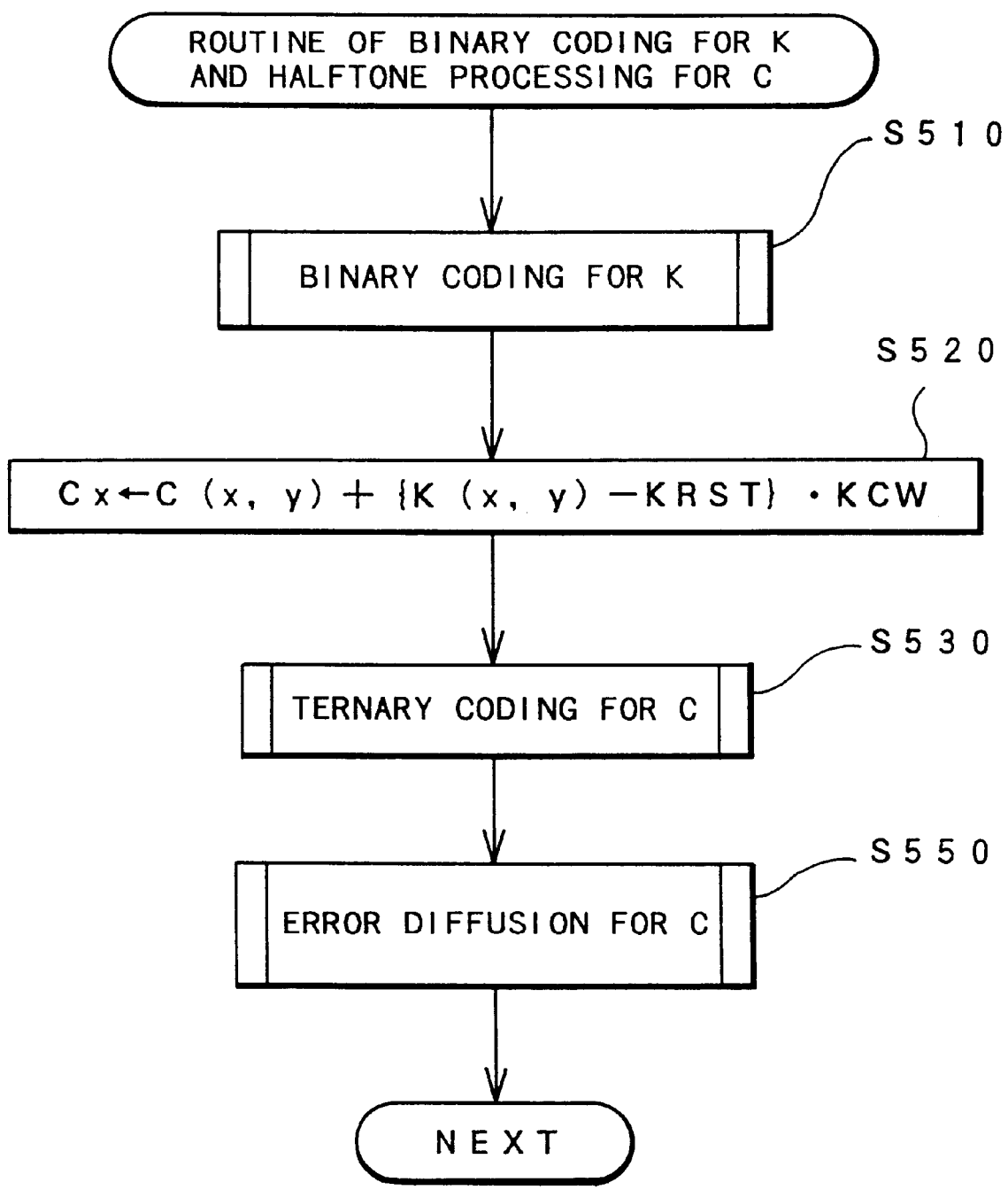
FIG. 28 is a flowchart showing an essential part of a fifth embodiment according to the present invention.

The following describes a fifth embodiment according to the present invention. Like the fourth embodiment, the structure of the fifth embodiment makes the on/off state of dots by black ink reflect upon formation of dots by deep cyan ink and light cyan ink. The hardware structure of the printing system and most part of the processing in the fifth embodiment are identical with those of the fourth embodiment. The flowchart of FIG. 28 corresponds to the flowchart of FIG. 25 in the fourth embodiment. The fifth embodiment carries out the processing up to the binary coding process for black ink (the processing of step S410) and the processing after the error diffusion process for cyan ink (the processing of step S450) in the fourth embodiment. Referring to FIG. 28, in the fifth embodiment, after the binary coding process for black ink (step S510), the program calculates modified data Cx. The calculation of the fifth embodiment is different from that of the fourth embodiment. In the fifth embodiment, the modified data Cx is obtained by adding the product of the difference between the tone data K(x,y) of black ink and the resulting value KRST with respect to the dots of black ink and a weighting coefficient KCW to the tone data C(x,y) of the cyan component in the target pixel. This is expressed as:

$$Cx = C(x,y) + \{K(x,y) - KRST\} \cdot KCW$$

Figure 29:
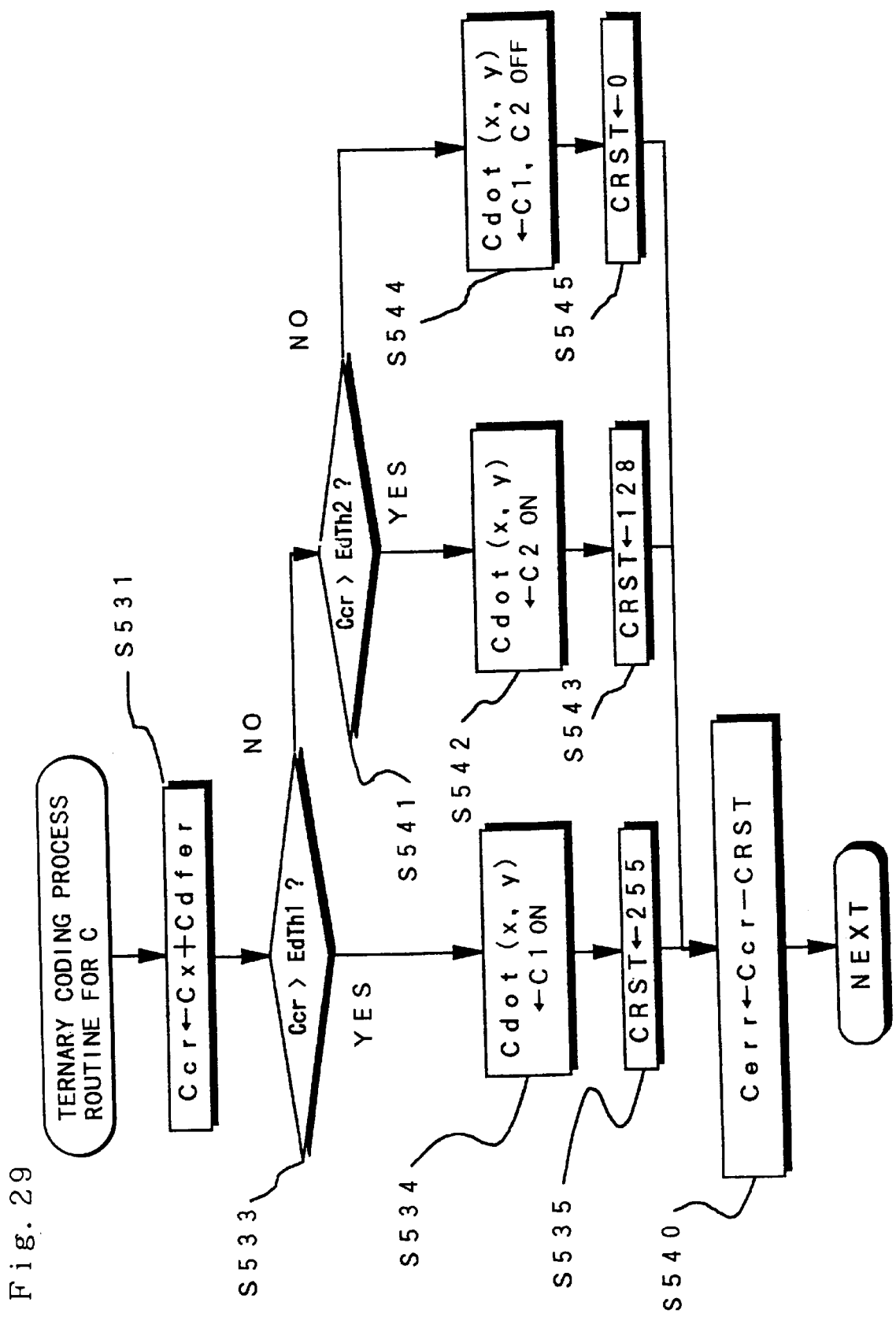
FIG. 29 is a flowchart showing a ternary coding process for cyan ink C in the fifth embodiment.

The program then carries out the ternary coding process for cyan ink (step S530). The flowchart of FIG. 29 shows the details of the ternary coding process. The ternary coding process of the fifth embodiment is identical with that of the fourth embodiment, except the procedure of the fifth embodiment does not include the process of determining whether or not dots of black ink are in the off state (step S432 in the flowchart of FIG. 27) as well as the process of turning off the cyan dots C1 and C2 (step S446) and the process of setting the resulting value CRST equal to 255 (step S447) in response to the negative answer of the decision point.

In this embodiment, the dots of cyan ink C1 and C2 are not always turned off in case that the dots of black ink are in the off state. Even when dots of black ink are formed, there exists a possibility of formation of dots of cyan ink. The modified data Cx in the fifth embodiment is, however, obtained by adding the difference between the tone data K(x,y) of black ink and the resulting value KRST (more precisely, the product of the difference and the weighting coefficient KCW) to the tone data C(x,y) of the cyan component. When dots of black ink are formed (KRST=255), the modified data Cx of cyan ink accordingly becomes smaller than the tone data C(x,y) of cyan ink. This prevents dots of cyan ink from being readily formed.

The subtraction of the resulting value from the tone data of black ink in the calculation of the modified data Cx of the cyan component causes dots of cyan ink to be not generally formed in the vicinity of dots of black ink in case that dots of black ink have been formed (resulting value KRST=255). Since the difference between the tone data of black ink and its resulting value is added to the tone data of cyan ink in the fifth embodiment, the correction by the black ink is substantially equal to zero in a specific area, while having local effects to prevent formation of dots by cyan ink in the vicinity of black dots. The weighting coefficient KCW may be equal to one or alternatively smaller than or greater than one. Like the fourth embodiment, the weighting coefficient KCW smaller than one makes it easy to form dots of cyan ink on the average, whereas the weighting coefficient KCW greater than one makes it difficult to form dots of cyan ink on the average.

As discussed previously, the effects of the dots by black ink are freely controlled by varying the weighting coefficient KCW. The weighting coefficient close to one does not substantially affect the density of cyan ink on the average, while having local effects. Although the fifth embodiment carries out the ternary coding process for cyan ink, when the head can discharge at least three different inks of different densities, the fourth or higher coding of the tone expression may be realized. The binary or higher coding may also be realized in combination with the multi-tone expression by the overlapped dots of lower-density ink. The structure of the fifth embodiment is not restricted to cyan ink but is also applicable to magenta ink and any other inks used in the printer.

Figure 30:
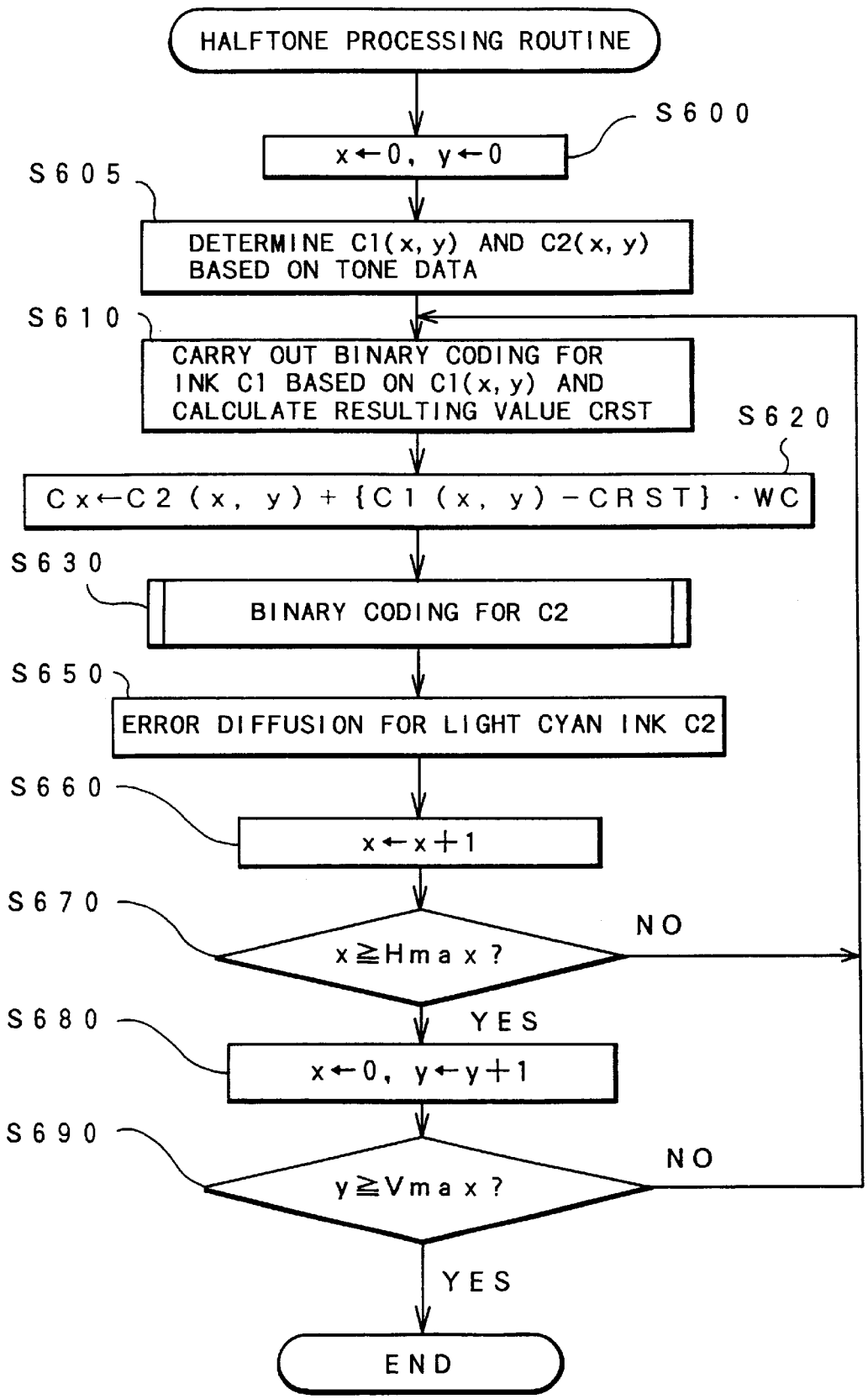
FIG. 30 is a flowchart showing a halftone processing routine executed in a sixth embodiment according to the present invention.

In the fourth and the fifth embodiments discussed above, the on/off state of dots by black ink affects the determination of whether or not dots are formed by cyan inks C1 and C2. The technique of the fifth embodiment may be applicable to the determination of formation of dots by the cyan ink C1 and the light cyan ink C2 (or the magenta inks M1 and M2). The flowchart of FIG. 30 shows a halftone processing routine in such a case. Steps of FIG. 30 other than steps S605 and S650 are identical with those of the fourth embodiment. These identical steps have like numerals in the lower two places and are not specifically described here. Although FIG. 30 relates to the halftone processing for cyan ink, the same procedure is applicable to the higher-density ink and lower-density ink of other hues.

When the halftone processing routine of FIG. 30 starts, after the initialization (step S600), the program determines the recording densities to be realized by the cyan ink C1 and the light cyan ink C2, that is, dot recording ratios C1(x,y) and C2(x,y), based on the tone data C(x,y) of cyan ink (step S605). The dot recording ratios (recording densities) to be realized by these inks may be determined according to the relationship of FIG. 13 discussed in the first embodiment. The program then carries out the binary coding process for cyan ink C1 based on the recording density C1(x,y) thus determined with respect to the cyan ink C1, and calculates a resulting value CRST (step S610). The process of binary coding and calculating the resulting value for the cyan ink C1 may follow the procedure of the first embodiment or alternatively the procedure of the fourth embodiment.

Modified data Cx for cyan ink is then calculated from the resulting value CRST (step S620). The modified data Cx is obtained by adding the product of the difference between the recording density C1(x,y) of cyan ink C1 and the resulting value CRST with respect to the dots of the cyan ink C1 and a predetermined weighting coefficient WC to the recording density C2(x,y) of the light cyan ink C2. This is expressed as:

$$Cx=C2(x,y)+\{C1(x,y)-CRST\} \cdot WC$$

After calculating the modified data Cx, the program carries out the binary coding process for the light cyan ink C2 (step S630). The binary coding process may follow the procedure of the first embodiment or alternatively the procedure of the fifth embodiment. After the binary coding process, the program carries out the error diffusion process for the light cyan ink C2 (step S650) and distributes the error due to the on/off operation of the cyan ink C1 and the light cyan ink C2 to the peripheral pixels. The above processing is repeatedly executed for the whole image (0<x≦Hnax, 0<y≦Vmax) (steps S660 through S690).

The sixth embodiment discussed above makes the on/off state of the dots by either one of the higher-density ink C1 and the lower-density ink C2 reflect upon the on/off state of the dots by the other, thereby realizing the appropriate halftoning as a whole. Unlike the first embodiment, the sixth embodiment does not necessarily turn off the dots by the lower-density ink when the dots by the higher-density ink are on. Although formation of dots by the higher-density ink makes it rather difficult to form dots by the lower-density ink, the dots may be formed by the lower-density ink according to the requirements. This improves the accuracy of the halftone processing. For example, the technique of the sixth embodiment ensures the appropriate results when the density to be realized by the deep dots and the light dots exceeds 100%. This is especially advantageous when the density realized by the deep dots and the light dots is varied, for example, with the quality of paper. In the printing system where the two-time discharge of the ink of a fixed density at the same place creates the density difference from the one-time discharge, the number of times of discharging ink results in formation of at least two different dots having different densities per unit area. The technique of the sixth embodiment is applicable to this structure where an identical ink is used for both the cyan ink C1 and the light cyan ink C2. The technique of the sixth embodiment is widely applicable to a variety of hardware structures as well as different ink densities.

In the sixth embodiment, the calculation of the modified data Cx (step S620) may be replaced by:

$$Cx=C2(x,y)+C1(x,y)-CRST \cdot WC$$

The sum C2(x,y)+C1(x,y) corresponds to the density to be realized by the whole cyan ink and may be regarded as the input tone data DS. The modified data Cx can thus be obtained by:

$$Cx=DS(x,y)-CRST \cdot WC$$

In this case, it is required to determine the recording density of only the higher-density ink, instead of determining the recording densities of both the higher-density ink and the lower-density ink at step S605. In this structure, however, the weighting coefficient WC only affects the resulting value CRST unless the weighting coefficient WC is equal to one.

In the above embodiments, the programs for controlling formation of dots are stored in the printer driver 96 included in the computer 90. These programs may, however, be stored in the printer 20. For example, in case that the computer 90 sends image information written in a language, such as PostScript, the printer 20 has a halftone module and other required elements. In the embodiments, the software realizing these functions is stored in a hard disk of the computer 90 and incorporated into the operating system in the form of the printer driver at the time of activation of the computer 90. In accordance with another possible application, the software may be stored in portable storage media (carriable storage media), such as floppy disks and CD-ROMs, and transferred from the portable storage media to the main memory of the computer system or an external storage device. The software may be transferred from the computer 90 to the printer 20. Still another possible application utilizes an apparatus for supplying the software via a communication line. In this structure, the contents of the halftone module may be transferred to either the computer 90 or the printer 20 via the communication line.

Figure 31:
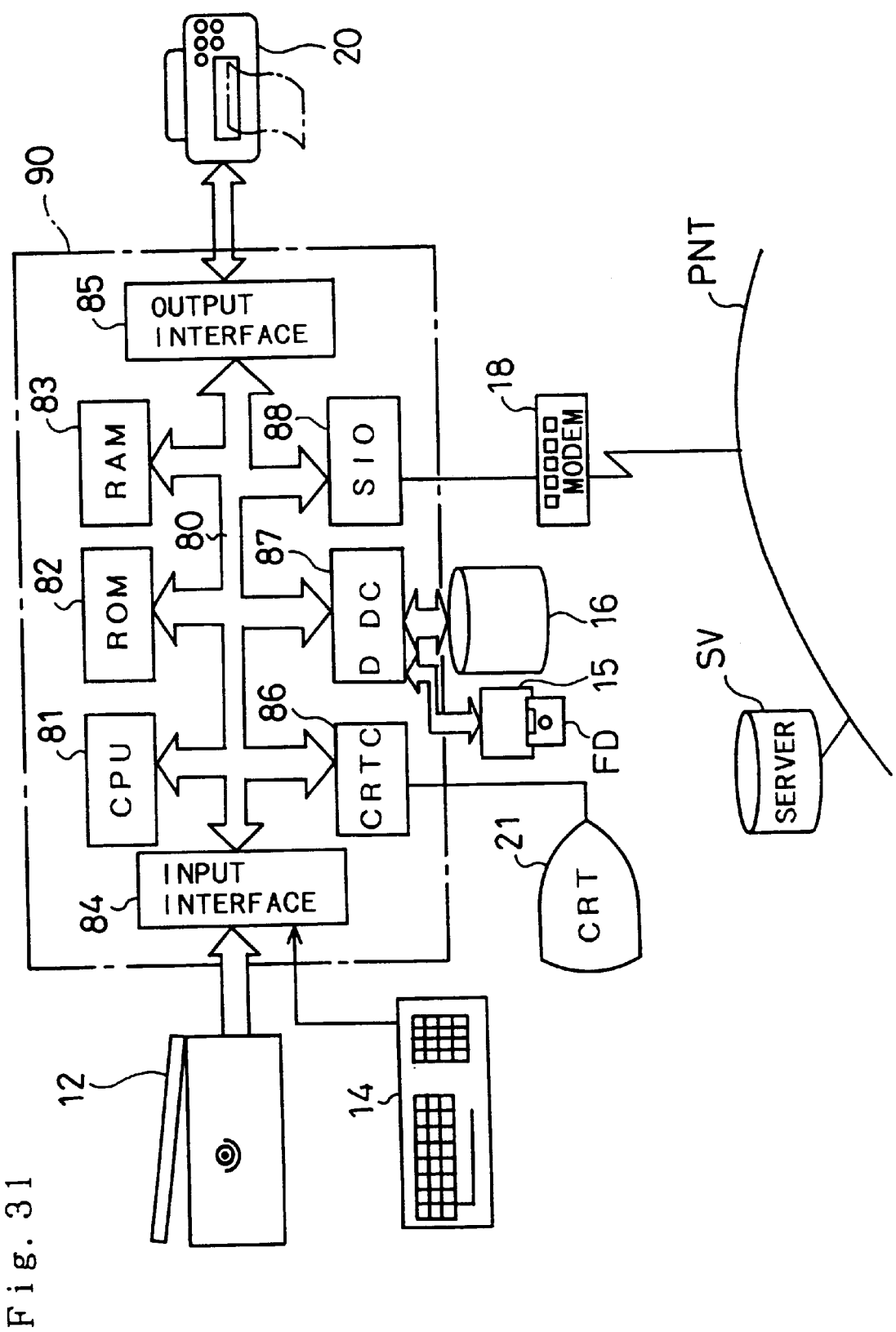
FIG. 31 illustrates an internal structure of the computer 90 and connection thereof with a network.
Figure 32A:
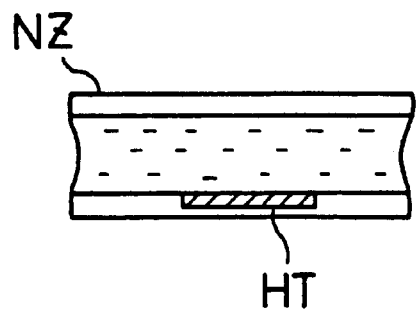
FIG. 32 shows another mechanism for discharging ink particles.
Figure 32B:
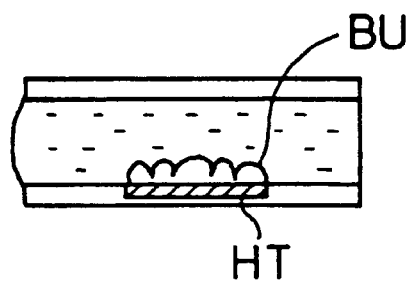
Figure 32C:
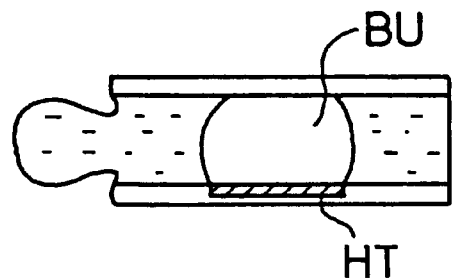
Figure 32D:
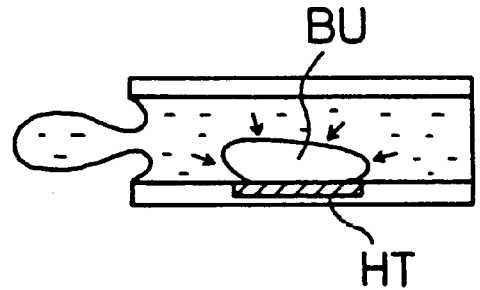
Figure 32E:
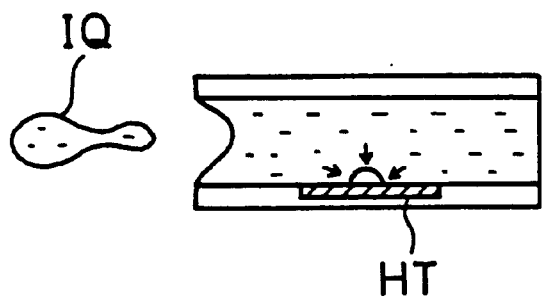

The computer 90 may have an internal structure as shown in the block diagram of FIG. 31. The computer 90 includes a CPU 81 for executing a variety of arithmetic and logic operations according to programs in order to control the actions related to image processing, and other peripheral units mutually connected to one another via a bus 80. A ROM 82 stores programs and data required for execution of the variety of arithmetic and logic operations by the CPU 81. A RAM 83 is a memory, which various programs and data required for execution of the variety of arithmetic and logic operations by the CPU 81 are temporarily read from and written in. An input interface 84 receives input signals from a scanner 12 and a keyboard 14, whereas an output interface 85 sends output data to the printer 20. A CRTC 86 controls signal outputs to a CRT 21 that can display color images. A disk controller (DDC) 87 controls transmission of data from and to a hard disk 16, a flexible disk drive 15, and a CD-ROM drive (not shown). The hard disk 16 stores a variety of programs that are loaded into the RAM 83 and executed, as well as other programs that are supplied in the form of a device driver. A serial input-output interface (SIO) 88 is also connected to the bus 80. The SIO 88 is connected to a public telephone network PNT via a modem 18. The (image processing apparatus 30 is connected with an external network via the SIO 88 and the modem 18, and can access a specific server SV in order to download the programs required for image processing into the hard disk 16. The computer 90 may alternatively execute the required programs loaded from a flexible disk FD or a CD-ROM.

The variety of programs executed in the above embodiments may be recorded on the recording media, such as flexible disks and CD-ROMs. The computer 90 reads these programs by means of the disk drive 15, thereby realizing the image recording method discussed above.

In the above embodiments, a predetermined voltage is applied to the piezoelectric elements PE for a predetermined time period, in order to discharge both the low-density ink and the high-density ink. Another method may, however, be applicable to discharge inks. The available ink-discharge techniques can be classified into two types; that is, the method of separating ink particles from a continuous jet stream of ink and the on-demand method applied in the above embodiments. The former type includes a charge modulation method that separates droplets of ink from a jet stream of ink by means of charge modulation and a micro-dot method that utilizes fine satellite particles produced in the process of separating large-diametral particles from a jet stream of ink. These methods are applicable to the printing system of the present invention that utilizes inks of different densities.

The on-demand type, on the other hand, produces ink particles for the respective dot units according to the requirements. An available method of the on-demand type, other than the method utilizing the piezoelectric elements applied in the above embodiments, arranges a heating body HT in the vicinity of nozzles NZ of ink, produces bubbles BU by heating ink, and makes ink particles IQ discharged by the pressure of the bubbles BU as shown in FIGS. 32(A) through 32(E). Such on-demand type methods are applicable to the printing system of the present invention that utilizes inks of different densities or plural types of dots having different diameters. The on-demand method is also applicable to the structure, in which dots of different densities are formed by discharging ink of a specific density by a plurality of times.

INDUSTRIAL APPLICABILITY

The printing system, the image recording method, and the program product for storing the image recording method according to the present invention discussed above enable multi-tone images to be printed on an object, such as paper, with at least two different inks of different densities. The principle of the present invention is especially suitable for recording high-quality images with a printing system, such as a printer, with a less number of tones per dots.

What is claimed is:

1. An image processing system which converts original image data to a distribution of at least two different dots having different densities per unit area on an object, said image processing system comprising:

recording density inputting means for specifing a recording density to be realized by at least one of a higher-density dot having a higher density per unit area and a lower-density dot having lower-density per unit area, corresponding to a tone signal of said original image data;

a multi-one section comprising, a first multivaluing means for carrying out a multivaluing operation based on the inputted recording density, and using the specified recording density to determine whether one of the higher-density dot having a higher density per unit area and the lower-density dot having a lower density per unit area is to be formed, and a second multivaluing means for carrying out a multivaluing operation based on a result of the first multivaluing operation and the specified recording density to determine whether the other one of said dots is to be formed.

2. An image processing system in accordance with claim 1, wherein said recording density inputting means specifies a recording density to be realized by one of the higher-density dot and the lower-density dot as well as a recording density to be realized by the other one of the higher-density dot and the lower density dot, corresponding to said tone signal of the original image data, said system further comprising:

recording density correcting means for obtaining correction data, which reflects upon the recording density to be realized by the other one of said dots, based on the result of the multivaluing operation with respect to the selected one of said dots, in order to correct the recording density to be realized by the other one of said dots, wherein said second multivaluing means activates said multivaluing operation for forming the other one of said dots, under the cause that said reflected recording density to be realized by the other one of the dots is said corrected recording density.

3. An image processing system in accordance with claim 2, wherein said recording density correcting means carries out the correction to reflect a local recording density based on the result of the multivaluing operation by said first multivaluing means and to cause a mean recording density in a specified range to be substantially equal to the recording density to be realized by the selected one of the higher-density dot and the lower-density dot.

4. An image processing system in accordance with claim 3, wherein said recording density correcting means adds a difference between the recording density to be realized by the selected one of the dots and the recording density realized by the result of the multivaluing operation by said first and said second multivaluing means to the recording density to be realized by the other one of the dots.

5. An image processing system in accordance with claim 1, wherein said first multivaluing means activates said multivaluing operation for forming the selected dot, prior to the multivaluing operation for the other one of said dots, and said second multivaluing means activates said multivaluing operation, in case the selected dot is determined to be formed as a result of the multivaluing operation by said first multivaluing, said system further comprising:

error diffusion means for computing a difference between a first density corresponding to the tone signal and a second density based on the multivaluing operation of said first and second multivaluing means as a density error, and distributing the density error to peripheral pixels in the vicinity of a current target pixel of the image data, in order to reflect upon the multivaluing operation by said first and second multivaluing means with respect to the peripheral pixels.

6. An image processing system in accordance with claim 5, wherein said at least two different dots having different densities per unit area are formed with a chromatic color ink, said system further comprising:

third multivaluing means for carrying out a multivaluing operation for an achromatic color ink and using said recording density to form the dot of the achromatic ink based on the recording density of an achromatic color ink to form said image with a chromatic color ink; and modification means for activating said first and said second multivaluing means, and said error diffusion means, based on the result of multivaluing operation for said achromatic color ink by said third multivaluing means.

7. An image processing system in accordance with claim 1, wherein said first multivaluing means carries out the multivaluing operation for forming the dot having a higher density per unit area.

8. An image processing system in accordance with claim 1, wherein said first multivaluing means carries out the multivaluing operation for forming the dot having a lower density per unit area.

9. An image processing system in accordance with claim 1, wherein said first multivaluing means activates said multivaluing operation through a dither method.

10. An image processing system in accordance with claim 9, wherein said first multivaluing means uses a threshold matrix of discrete dither.

11. An image processing system in accordance with claim 1, wherein said at least two different dots having different densities per unit area are formed in different diameters.

12. An image processing system which converts original image data to a distribution of at least two different dots having different densities per unit area on an object, said image processing system comprising:
   input means for successively receiving a tone signal of each target pixel included in said original image data;
   recording density inputting means for specifying a first dot recording density defined as a tone value to be realized by a first dot selected among said at least two different dots having different densities per unit area, corresponding to the tone signal;
   first multivaluing means for determining whether or not the first dot is to be formed, based on the first dot recording density;
   correction signal computing means for computing a correction signal by adding quantization errors distributed from peripheral processed pixels in the vicinity of said target pixel to the input tone signal;
   second multivaluing means for, when said first multivaluing means determines no formation of the first dot, determining whether or not a second dot having a different density per unit area from that of the first dot is to be formed, based on the correction signal; and
   error diffusion means for computing a quantization error, which is a difference between the correction signal and a tone value realized by the formed dots, as a density error, based on the results of the multivaluing operation by said first multivaluing means and said second multivaluing means, and distributing and diffusing the computed density error to peripheral pixels in the vicinity of said target pixel.

13. An image processing system in accordance with claim 12, wherein said first multivaluing means carries out the multivaluing operation for forming the dot having a higher density per unit area.

14. An image processing system in accordance with claim 12, wherein said first multivaluing means carries out the multivaluing operation for forming the dot having a lower density per unit area.

15. An image processing system in accordance with claim 12, said system further comprising:
   error diffusion means for computing a difference between the recording density specified by said recording density inputting means and a recording density realized by said at least two different dots having different densities per unit area as a density error, based on the multivaluing operation of dot formation by said first multivaluing means and said second multivaluing means, and distributing the density error to peripheral pixels in the vicinity of a current target pixel of dot formation, in order to reflect upon the multivaluing operation of dot formation with respect to the peripheral pixels by said second multivaluing means.

16. An image processing system in accordance with claim 12, wherein said at least two different dots having different densities per unit area are formed with a chromatic color ink, said system further comprising:
   third multivaluing means for carrying out a multivaluing operation for an achromatic color ink, so as to determine whether or not the achromatic dot is to be formed by said achromatic color ink; and
   determination modifying means for activating said first multivaluing means, said second multivaluing means, and said error diffusion means, based on the result of multivaluing operation for said achromatic color ink by said third multivaluing means.

17. An image processing system in accordance with claim 16, wherein when said third multivaluing means determines formation of the achromatic dot, the calculation of the density error by said error diffusion means is carried out by a technique that is different from the technique applied for the calculation when said first multivaluing means determines formation of the selected dot.

18. An image processing system in accordance with claim 16, wherein said chromatic color ink is at least one of cyan and magenta.

19. An image processing system in accordance with claim 16, wherein said chromatic color inks are cyan and magenta inks,
   said achromatic color ink is black ink,
   said third multivaluing means determining whether or not the black dot is to be formed by said black ink, when said third multivaluing means determines formation of the black dot by said black ink, said determination modifying means assuming that said first multivaluing means determines formation of a selected dot among said at least two different dots having different densities per unit area by said cyan and magenta inks and activating said second multivaluing means and said error diffusion means.

20. An image processing system in accordance with claim 12, wherein said second multivaluing means comprises:
   local effect computing means for calculating a local effect from the recording density of the selected dot, which is subjected to determination of multivaluing operation by said first multivaluing means, and a printing density realized by the selected dot; and
   recording density correcting means for correcting the recording density to be realized by the other dot by taking into account the local effect, so as to affect the determination of dot formation with respect to the other dot.

21. An image processing system in accordance with claim 20, wherein said local effect computing means calculates a difference between the recording density of the selected dot and the printing density realized by the selected dot as a local error,
   said recording density correcting means adding a product of the local error and a predetermined weight to the recording density to be realized by the other dot, so as to affect the determination of dot formation with respect to the other dot.

22. An image processing system which converts original image data to a distribution of at least two different dots having different densities per unit area by a chromatic color ink as well as an achromatic dot by an achromatic color ink, said image processing system comprising:
   density specifying means for specifying a density to be realized by said chromatic color ink and a density to be realized by said achromatic color ink, corresponding to a tone signal of said image data;
   achromatic multivaluing means for carrying out a multivaluing operation for said achromatic color ink, based on the specified density to be realized by said achromatic color ink, and using said specified density to form said achromatic dot;
   density correcting means for obtaining correction data, which reflects upon the density to be realized by said chromatic color ink, based on the result of the multivaluing operation with respect to said achromatic color ink, in order to correct the density to be realized by said chromatic color ink; and chromatic multivaluing means for carrying out a multivaluing operation with respect to said at least two different dots having different densities per unit area, based on the corrected density to be realized by said chromatic color ink, and using the corrected density to form said at least two different dots.

23. An image processing system in accordance with claim 22, said system further comprising:

error diffusion means for computing a difference between a recording density corresponding to the tone signal and a recording density realized by the dots of said achromatic color ink and said chromatic color ink as a density error, based on the result of multivaluing operation by said achromatic multivaluing means and said chromatic multivaluing means, and distributing the density error to peripheral pixels in the vicinity of a current target pixel of said image data, in order to reflect upon the multivaluing operation with respect to the peripheral pixels by said achromatic multivaluing means and said chromatic multivaluing means.

24. An image processing system in accordance with claim 16, wherein said density correcting means carries out the correction to reflect a local achromatic color ink density based on the result of the multivaluing operation with respect to the dot of said achromatic color ink and to cause a mean achromatic color density in a specified range to be substantially equal to a density to be realized by said achromatic color ink.

25. An image processing system in accordance with claim 24, wherein said density correcting means adds a difference between the density to be realized by said achromatic color ink and the density of said achromatic color ink realized by the result of the multivaluing operation by said achromatic multivaluing means to the density to be realized by said chromatic color ink.

26. An image processing method for converting original image data to a distribution of at least two different dots having different densities per unit area on an object, said image processing method comprising:

inputting a recording density to be realized by at least a selected one of a higher-density dot having a higher density per unit area and a lower-density dot having a lower density per unit area, which are both included in said at least two different dots having different densities, corresponding to a tone signal of said original image data;

carrying out a multivaluing operation based on the inputted recording density, and using the inputted recording density to form the selected one of said dots;

making a result of the multivaluing operation reflect upon a recording density to be realized by the other one of said dots;

causing the other one of said dots to be subjected to a multivaluing operation according to the reflected recording density; and using the reflected recording density to form the other one of said dots.

27. A computer program product comprising a computer storage medium having a computer program embedded in the computer storage medium for implementing an image processing method for converting original image data to a distribution of at least two different dots having different densities per unit area on an object, the computer program performing the steps of:

inputting a recording density to be realized by at least a selected one of a higher-density dot having a higher density per unit area and a lower-density dot having a lower density per unit area, which are both included in said at least two different dots having different densities, corresponding to a tone signal of said original image data;

carrying out a multivaluing operation based on the inputted recording density, and using the inputted recording density to form the selected one of said dots;

making a result of the multivaluing operation reflect upon a recording density to be realized by the other one of said dots;

causing the other one of said dots to be subjected to a multivaluing operation according to the reflected recording density; and using the reflected recording density to form of the other one of said dots.

28. An image processing system which converts original image data to a distribution of at least two different dots having different densities per unit area on an object, said image processing system comprising:

a recording density inputting unit for specifing a recording density to be realized by at least one of a higher-density dot having a higher density per unit area and a lower-density dot having a lower density per unit area, corresponding to a tone signal of said original image data;

a multi-tone section comprising, a first multivaluing unit for carrying out a multivaluing operation based on the inputted recording density, and using the specified recording density to determine whether one of the higher-density dot having a higher density per unit area and the lower-density dot having a lower density per unit area is to be formed, and a second multivaluing unit for carrying out a multivaluing operation based on a result of the first multivaluing operation and the specified recording density to determine whether the other one of said dots is to be formed.

* * * * *

UNITED STATES PATENT AND TRADEMARK OFFICE
CERTIFICATE OF CORRECTION

PATENT NO.      : 6,338,538 B1           Page 1 of 1
DATED           : January 15, 2002
INVENTOR(S)     : Toshiaki It is certified that error appears in the above-identified patent and that said Letters Patent is hereby corrected as shown below:

<u>Title page,</u>
Items [12] and [75], the Inventor's name should read:

-- [12]   United States Patent
          Kakutani --

-- [75]   Inventor:   Toshiaki Kakutani, Suwa (JP) --

Item [63], the Related U.S. Application information should read:

--            Related U.S. Application Data

[63]    Continuation of application No. 09/029,865, filed on Mar.
        17, 1998, now Pat. No. 6,099,105, which is a continuation
        of PCT/JP97/02491, filed on Jul. 17, 1997. --

Item [30], the Foreign Application Priority information should read:

-- [30]         Foreign Application Priority Data

Jul. 18, 1996   (JP) ………………………….. 8-209232
        Nov. 22, 1996   (JP) ………………………….. 8-327845 --

Signed and Sealed this

First Day of October, 2002

Attest:

*Attesting Officer*

JAMES E. ROGAN
*Director of the United States Patent and Trademark Office*